(12) United States Patent
Hellenschmidt et al.

(10) Patent No.: US 9,073,472 B2
(45) Date of Patent: Jul. 7, 2015

(54) APPARATUS FOR THE SECURING OF A LOAD

(71) Applicant: CIMC Silvergreen GmbH, Neu-Ulm (DE)

(72) Inventors: Dieter Hellenschmidt, Blaustein (DE); Thomas Ortlieb, Gerlingen (DE); Markus Bauknecht, Lauchheim (DE); Jürgen Schaller, Kornwestheim (DE); Wentao Wang, Guangdong (CN)

(73) Assignee: CIMC SILVERGREEN GMBH (DE)

( * ) Notice: Subject to any disclaimer, the term of this patent is extended or adjusted under 35 U.S.C. 154(b) by 0 days.

(21) Appl. No.: 13/973,007

(22) Filed: Aug. 22, 2013

(65) Prior Publication Data

US 2014/0169905 A1 Jun. 19, 2014

(30) Foreign Application Priority Data

Sep. 6, 2012 (DE) .......................... 10 2012 215 863
Oct. 15, 2012 (DE) .......................... 10 2012 218 762
Mar. 28, 2013 (EP) ..................................... 13161573

(51) Int. Cl.
*B60P 7/12* (2006.01)
*B60P 3/077* (2006.01)

(52) U.S. Cl.
CPC .. *B60P 7/12* (2013.01); *B60P 3/077* (2013.01)

(58) Field of Classification Search
CPC ............................... B60P 7/0807; B60P 3/079
USPC ............. 410/49, 104, 101, 96, 105, 8, 12, 21, 410/23, 30; 411/182–184, 189, 431, 432
See application file for complete search history.

(56) References Cited

U.S. PATENT DOCUMENTS

| | | |
|---|---|---|
| 5,674,033 A | 10/1997 | Ruegg |
| 6,769,847 B1 | 8/2004 | Heilmann |
| 7,128,508 B2 * | 10/2006 | Anderson et al. ................ 410/30 |
| 7,401,995 B2 * | 7/2008 | Senakiewich, II ......... 403/374.4 |
| 7,556,463 B1 * | 7/2009 | Hall .............................. 410/104 |

(Continued)

FOREIGN PATENT DOCUMENTS

| | | |
|---|---|---|
| DE | 3235157 A1 | 3/1984 |
| DE | 9402778 U1 | 4/1994 |

(Continued)

OTHER PUBLICATIONS

German Search Report; German Patent Application No. 10 2012 218 762.6; Dated: Jun. 26, 2013; 5 pages.

(Continued)

*Primary Examiner* — Glenn Dayoan
*Assistant Examiner* — Sunsurraye Westbrook
(74) *Attorney, Agent, or Firm* — Cantor Colburn LLP

(57) ABSTRACT

The invention relates to an apparatus for the securing of a load at a load bed, said load bed having at least one longitudinal groove including at least one undercut; said apparatus comprising a clamping mechanism, said clamping mechanism comprising an actuation element and an adapter element having at least one engagement means which can be guided into the longitudinal groove, wherein the engagement means of the adapter element can be brought into engagement with the undercut of the longitudinal groove in a shape-matched and force-transmitting manner by means of the actuation element.

24 Claims, 25 Drawing Sheets

(56) References Cited

U.S. PATENT DOCUMENTS

Figure 1:
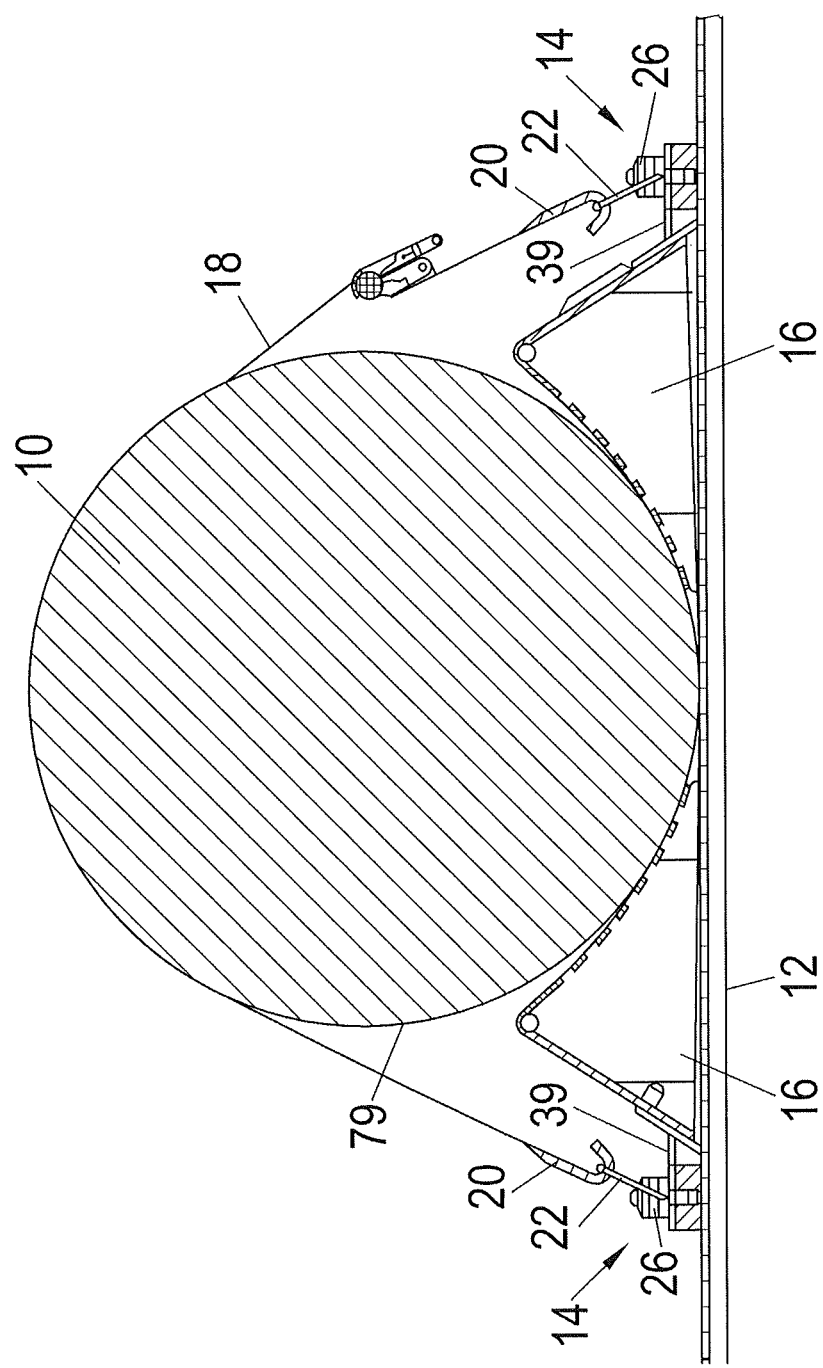

| | | | |
|---|---|---|---|
| 7,874,774 B2 * | 1/2011 | Peterson | 410/104 |
| 2002/0048495 A1 * | 4/2002 | Anderson et al. | 410/104 |
| 2005/0214093 A1 * | 9/2005 | Priesgen | 410/104 |

FOREIGN PATENT DOCUMENTS

| | | | |
|---|---|---|---|
| DE | 29714344 U1 | 12/1997 | |
| DE | 29800435 U1 | 4/1998 | |
| DE | 19851392 A1 | 5/1999 | |
| DE | 20018507 U1 | 2/2001 | |
| DE | 29917373 U1 | 2/2001 | |
| DE | 20020514 U1 | 3/2001 | |
| DE | 20303655 U1 | 6/2003 | |
| DE | 20302901 U1 | 6/2004 | |
| DE | 10307598 A1 | 9/2004 | |
| DE | 202004003303 U1 | 12/2004 | |
| DE | 102005005517 A1 | 9/2005 | |
| DE | 60118676 T2 | 11/2006 | |
| DE | 202007000046 U1 | 1/2008 | |
| DE | 602004005377 T2 | 6/2008 | |
| DE | 102007056471 A1 | 5/2009 | |
| EP | 1894773 A1 | 3/2008 | |
| FR | 2675442 A1 | 10/1992 | |
| FR | 2762815 A1 | 11/1998 | |

OTHER PUBLICATIONS

English Translation of German Search Report; German Patent Application No. 10 2012 218 762.6; Dated Jun. 26, 2013; 6 pages.

* cited by examiner

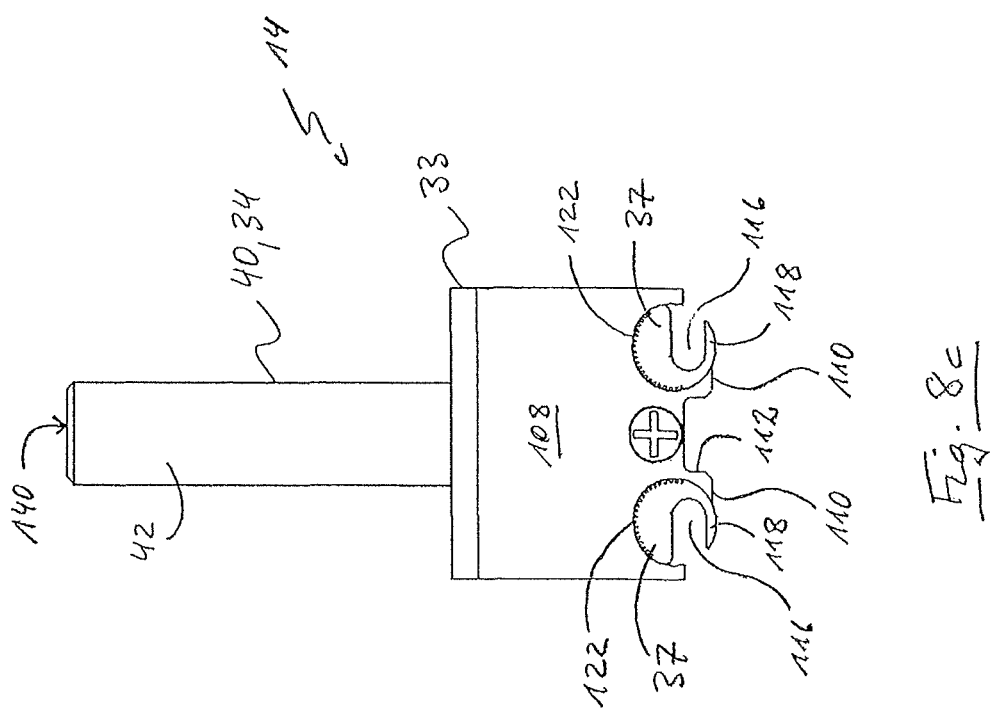

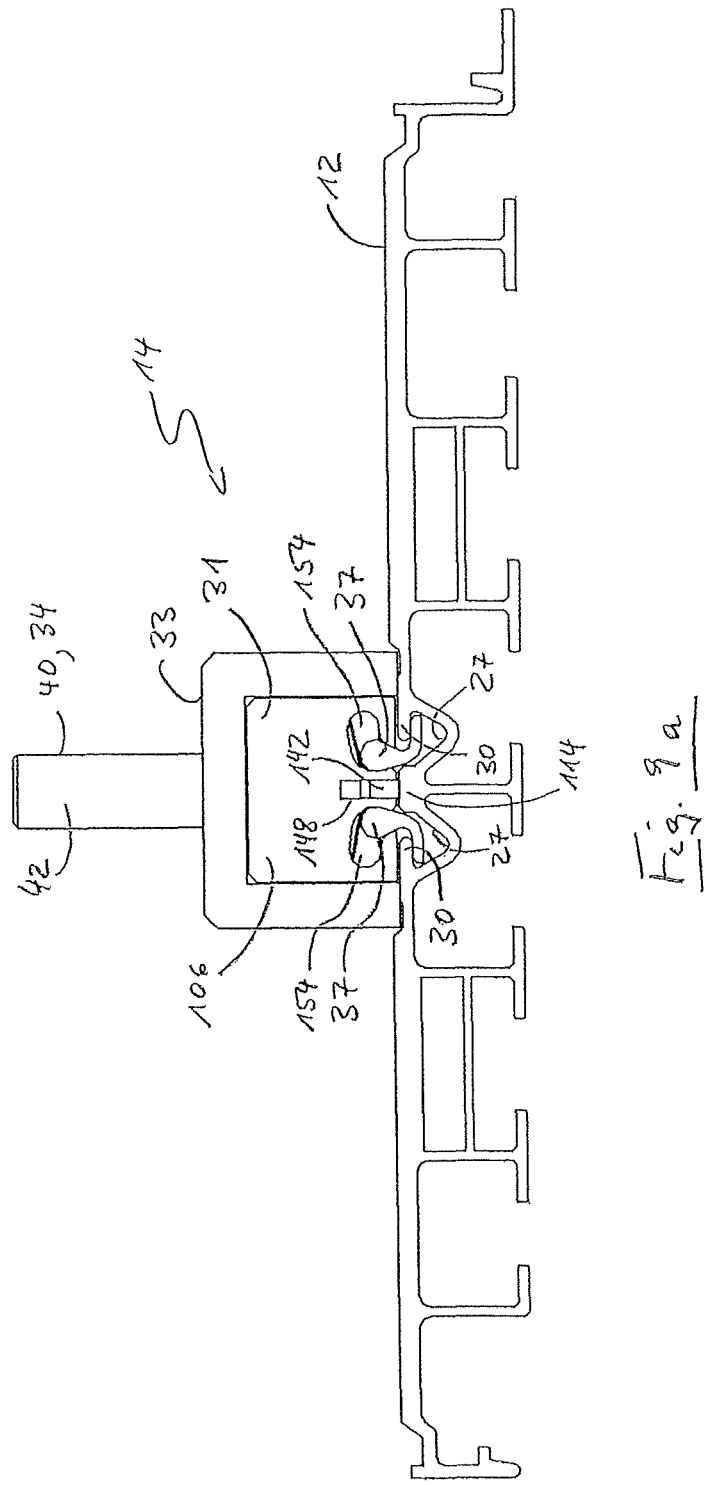

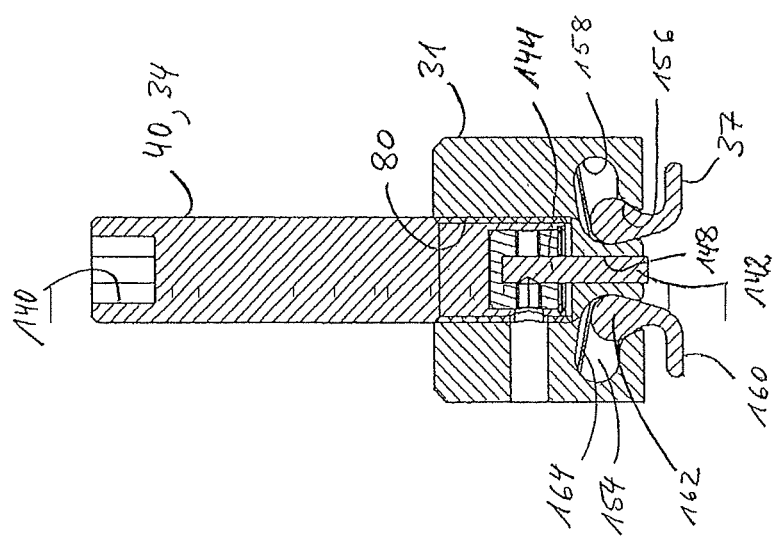

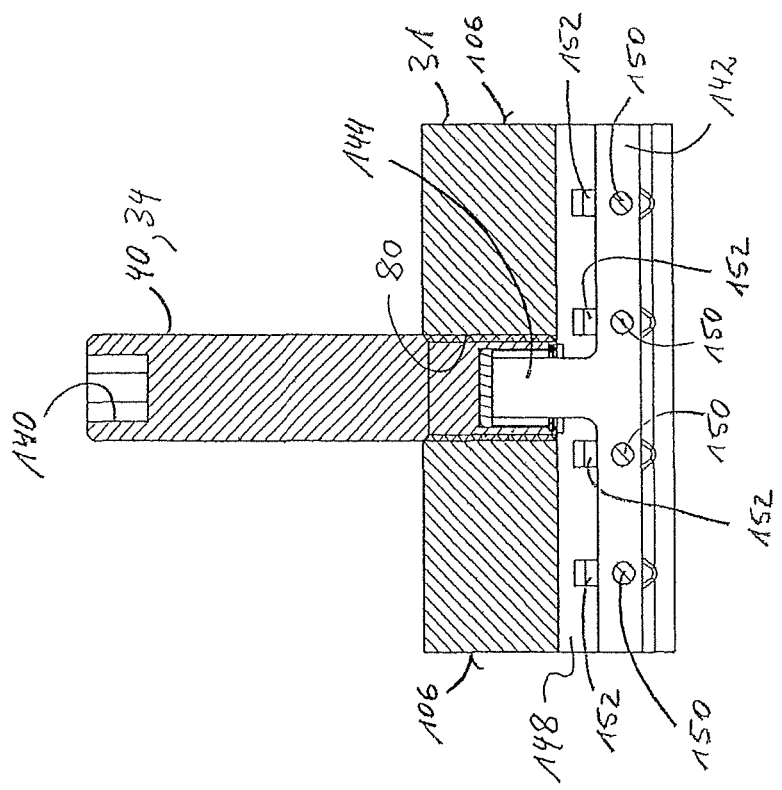

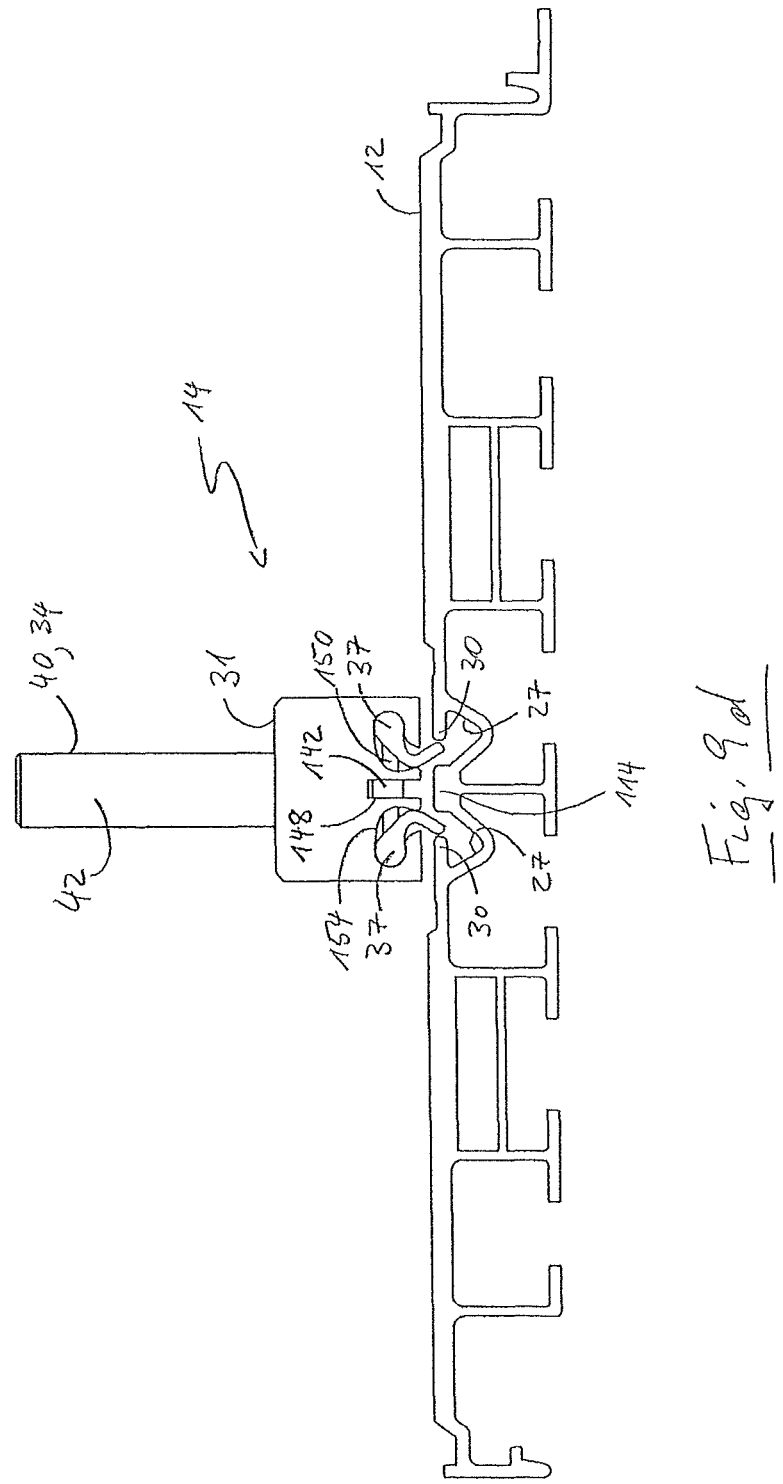

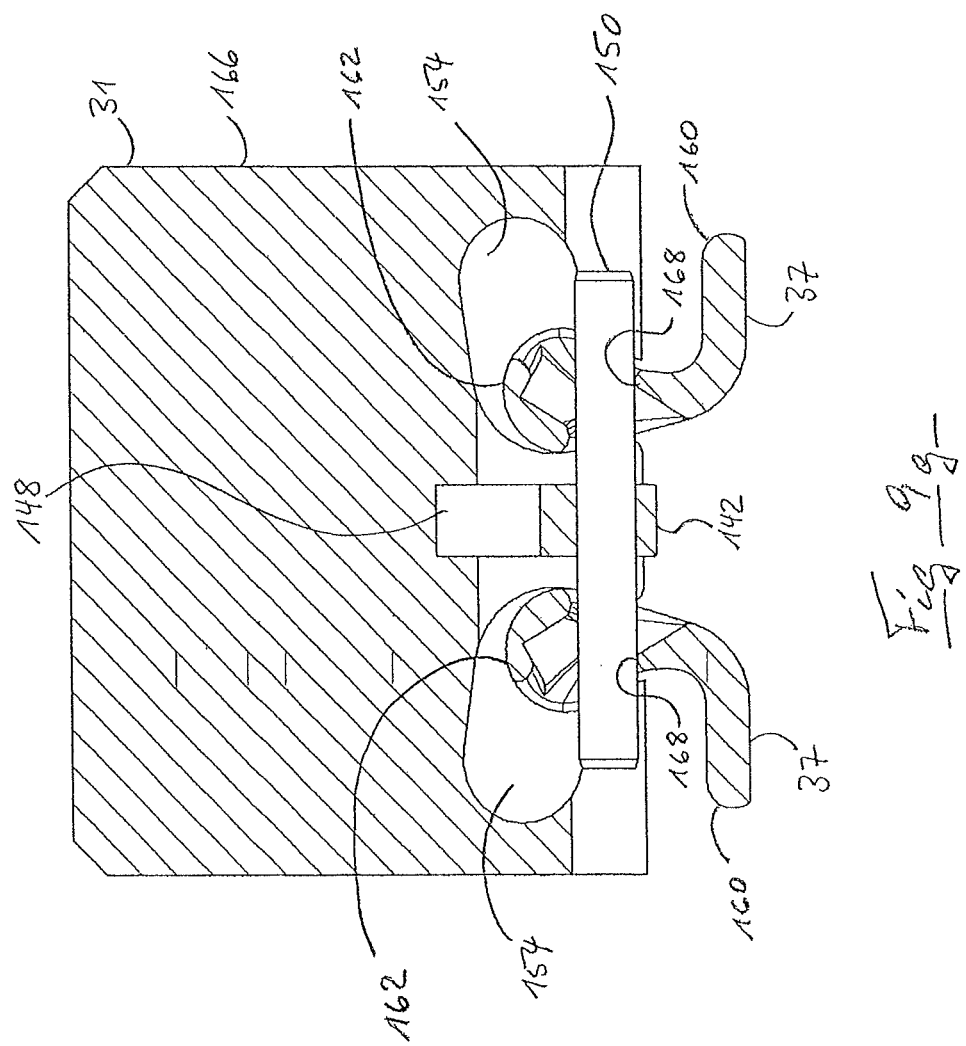

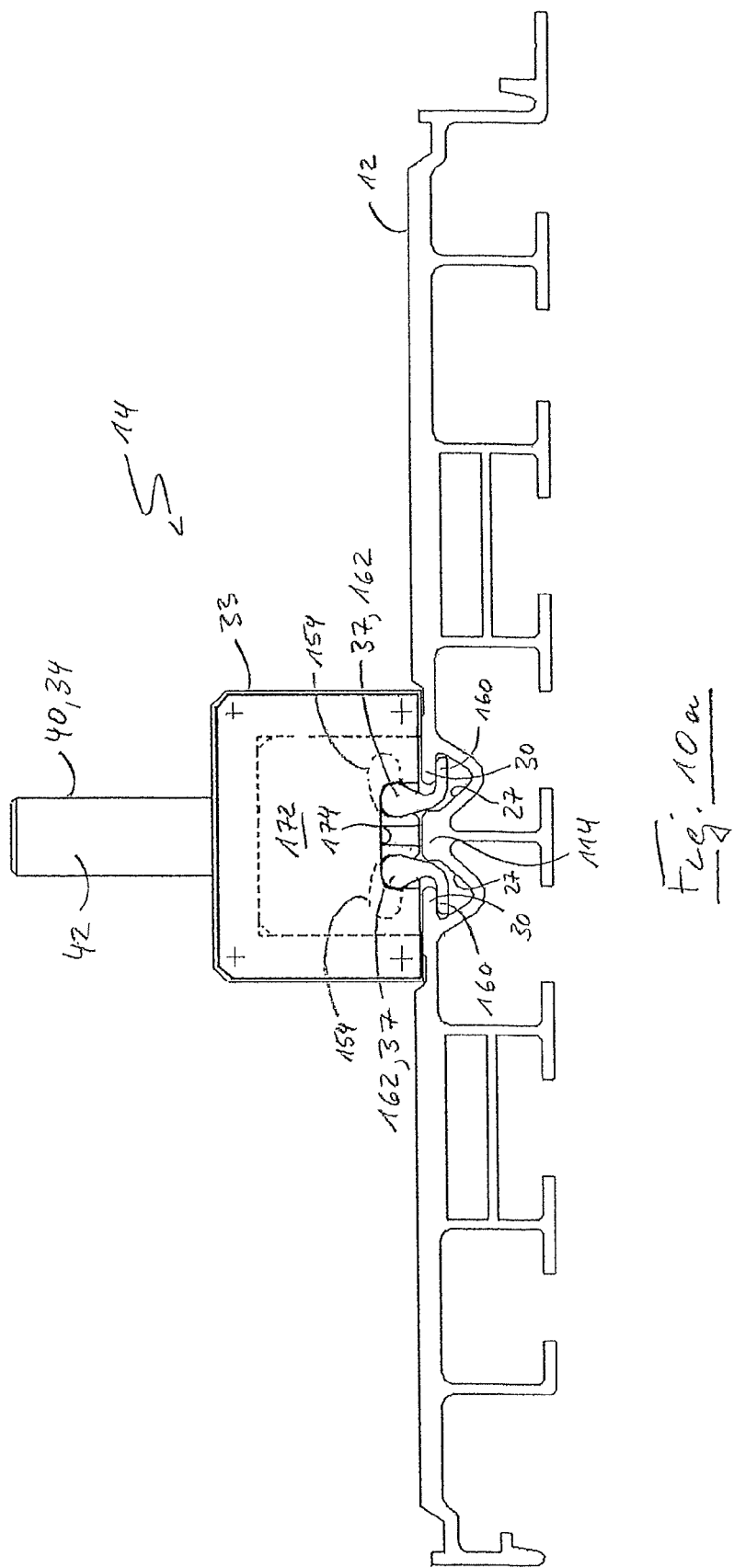

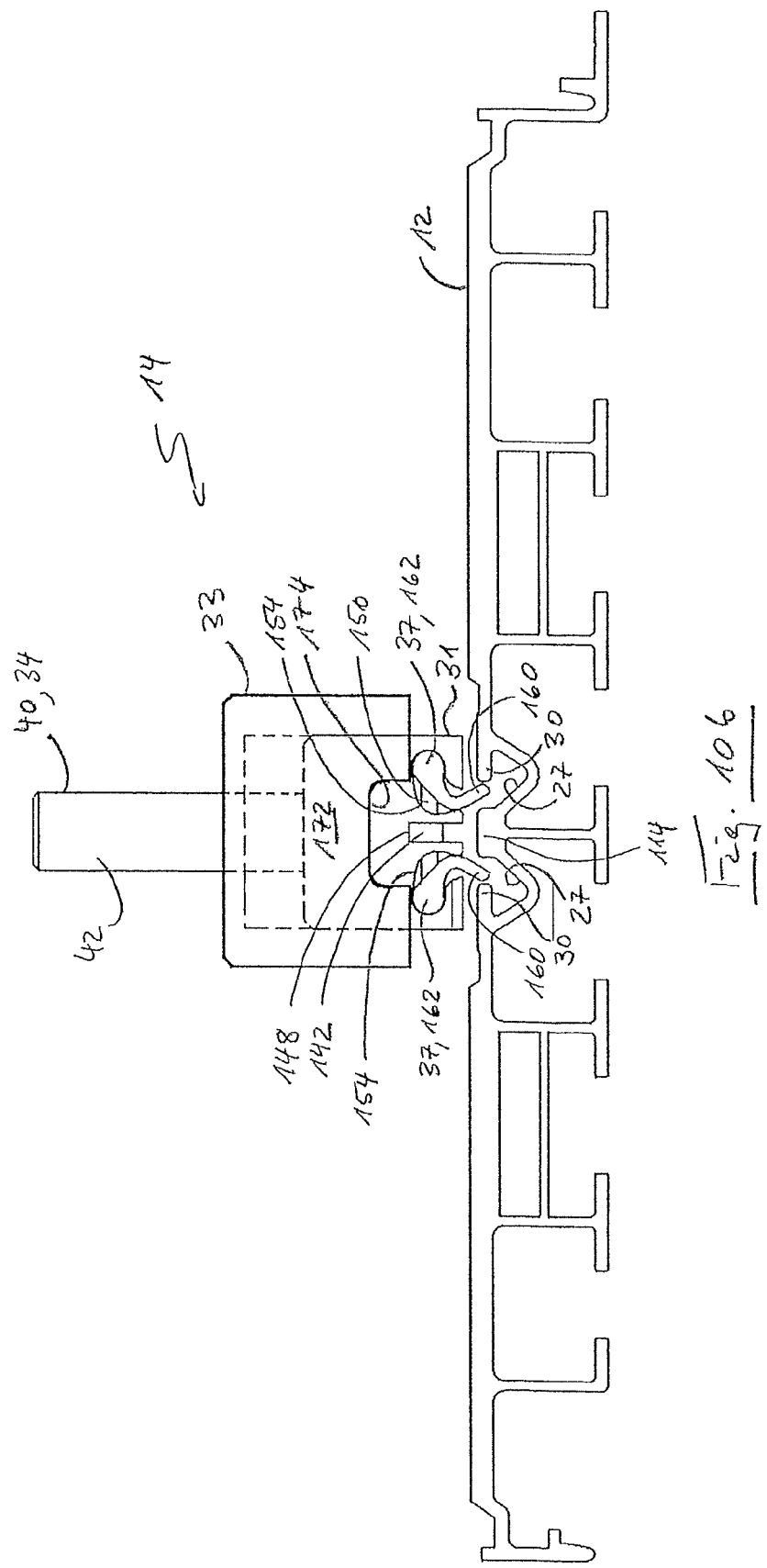

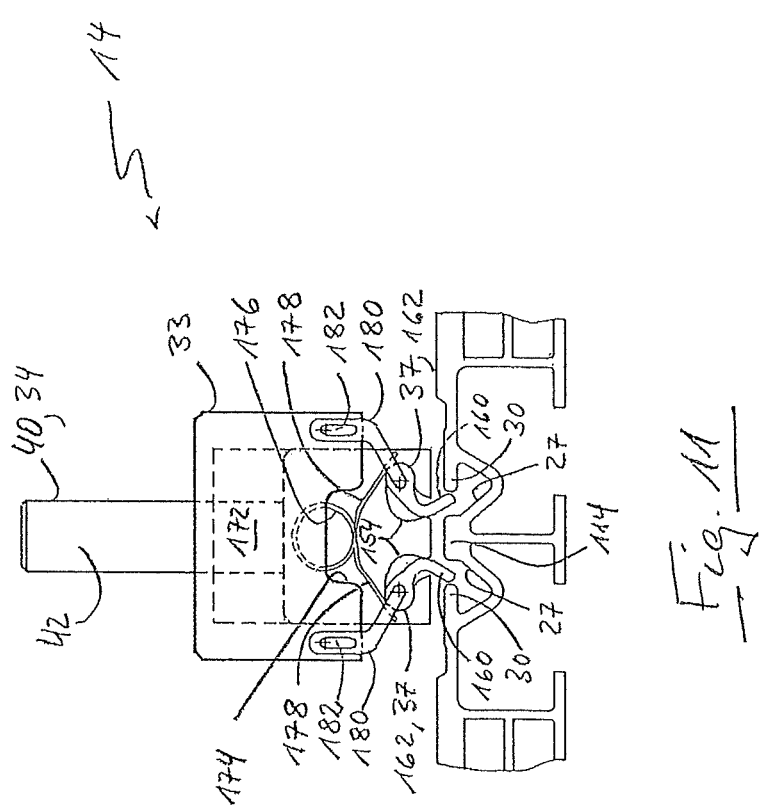

APPARATUS FOR THE SECURING OF A LOAD

The invention relates to an apparatus for the securing of a load at a load bed having at least one longitudinal groove.

Load securing apparatus are generally known, which are provided for installation at a longitudinal groove of a load bed, for example, of a transport vehicle. However, these known apparatus have the disadvantage that the apparatus requires a groove cut-out for the insertion into the longitudinal groove, which groove cut-out is typically located at an end of the longitudinal groove, so that after the insertion into the longitudinal groove, the load securing apparatus must be cumbersomely displaced to the desired position.

The invention is based on the object of developing a cost effective apparatus for the securing of a load, which has a lightweight and compact design, is easy to handle, and can be securely positioned without the load bed becoming damaged in this connection.

An apparatus having the features of claim 1 is provided in order to satisfy this object.

The apparatus in accordance with the invention is provided for the securing of a load at a load bed, for example, at a load bed of a container or of a transport vehicle, which load bed comprises at least one longitudinal groove having at least one undercut. The longitudinal groove can be, for example, a W-shaped groove, in which case the adapter element advantageously comprises two engagement means. However, the longitudinal groove does not necessarily need to comprise a W-shaped cross-section, but rather the longitudinal groove can also comprise, for example, an upside down T-shaped cross-section or another cross-section, as long as the cross-section defines at least one undercut. The load bed can be formed, for example, by an aluminum section in which the longitudinal groove is integrated.

The securing apparatus comprises a clamping mechanism, which in turn comprises an adapter element having an actuation element and at least one engagement means which can be inserted into the longitudinal groove of the load bed, in which the engagement means can be brought into shape-matched and force-transmitting engagement with the undercut of the longitudinal groove by means of the clamping mechanism in order to securely anchor the clamping mechanism and thereby ultimately the entire apparatus at the load bed, and therefore to securely fix the load.

In order to release the clamping mechanism, for example, to vary the position of the securing apparatus within the longitudinal groove or to completely remove the securing apparatus from the longitudinal groove, the engagement means and the undercut can reciprocally easily be brought out of engagement again by means of the actuation element.

It is understood that the clamping effect, and therefore ultimately the quality of the anchoring of the securing apparatus in the longitudinal groove, can be increased if the securing apparatus comprises more than one clamping mechanism. In this connection, multiple clamping mechanisms are preferably arranged one after another when viewed in the direction of the longitudinal groove.

Advantageous embodiments of the invention can be found in the dependent claims, the description, and the figures.

In accordance with a particularly preferred embodiment, at least one engagement means is movably supported in or at the adapter element and by means of a rotation, a pivoting and/or a displacement, the engagement means can be brought out of an insertion position, in which it can be inserted into the longitudinal groove, into an engagement position, in which it engages with an undercut of the longitudinal groove. This embodiment has the advantage that the securing apparatus can be inserted into the longitudinal groove independently of a groove cut-out at any arbitrary position of the longitudinal groove, and in this way the securing apparatus can be particularly easily installed.

In accordance with an embodiment which is structurally particularly easy to realize, the engagement means can be brought out of the insertion position and into the engagement position by means of an adjustment of the actuation element relative to the adapter element. The adjustment of the actuation element can consist of, for example, a rotation of a threaded bolt relative to the adapter element. Alternatively, it is possible to take the engagement means out of the insertion position and place the engagement means into the engagement position by moving a housing relative to the adapter element, with the housing at least partially surrounding the adapter element. By way of example, two movably supported engagement means can indirectly or indirectly be pressed apart by the housing in order to reach their engagement position.

In order to be able to realize a combination of a rotation and a displacement of the engagement means in a controlled manner, a moving block guide can be provided, along which the engagement means can be displaced during its movement out of the insertion position and into the engagement position.

A rack-and-pinion gear and/or a cam gear can be provided in order to translate a movement of the actuation element into a movement of the engagement means.

For the particularly easy handling of the securing apparatus, a spring element is preferably provided, against whose restoring force an engagement means, which is movably supported in or at the adapter element, can be brought out of an insertion position, in which it can be inserted into the longitudinal groove, and into an engagement position, in which it engages behind an undercut of the longitudinal groove, or against whose restoring force the engagement means can be brought out of the engagement position and into the insertion position. In this manner, the spring element supports a returning of the engagement means into the other position in each case.

In accordance with an embodiment, the spring element cooperates with a hook section of the engagement means, provided for the engagement with the longitudinal groove, and/or with an opposing section of the engagement means facing away from the hook section in order to bias the engagement means in its insertion position. In this case, the spring element is preferably a coil spring.

Alternatively or additionally, the spring element can define an axis of rotation for the engagement means, about which the engagement means rotates in its insertion position. The axis of rotation preferably extends substantially in parallel with respect to the longitudinal groove in the state in which the apparatus is installed at the load bed. In this variant, the spring element can be formed, for example, by a leaf spring.

In order to ensure a particularly reliable clamping of the securing apparatus at the load bed, a mechanism for the securing of the one or more engagement means in its/their engagement position is advantageously provided. In accordance with a particularly simple design, the securing mechanism comprises a housing which at least partially surrounds the adapter element and which housing can be brought into engagement with end sections of the engagement means, which project beyond the adapter element in order to keep the engagement means in their engagement position. By way of example, a recess can be formed in the housing, in which the end sections of the engagement means are received and held together for the securing of the engagement means. In this case, the engagement means are thus effectively secured from the outside. Alternatively or additionally, an elevation can be formed at an inner side of the housing, for example, in the form of an actuation plate, which is urged between the end sections of the engagement means, which project beyond the adapter element, in order to press the end sections of the engagement means outwards and secure them in the engagement position. In this variant, the engagement means are thus effectively secured from the inside.

In accordance with a further embodiment, the clamping mechanism comprises a housing in which the adapter element is movably received. In order for the housing to be able to support itself at a top side of the load bed when the engagement means is engaged with the undercut, the housing comprises a width which is greater than a width of an opening of the longitudinal groove. By way of example, the housing can be formed in the shape of a U section which surrounds a top side and two opposite outer sides of the received adapter element. However, a housing is also alternatively imaginable which completely encases the adapter element with the exception of a bottom side facing the load bed.

The adapter element can preferably be moved relative to the housing by means of the actuation element, in particular the adapter element can preferably be pulled into the housing in order to place the engagement means into engagement with the undercut for the clamping of the securing apparatus at the load bed, or can be pressed out of the housing in order to take the engagement means out of engagement with the undercut for the release of the securing apparatus from the load bed.

In accordance with an alternative embodiment, the adapter element can be moved away from the load bed by means of an adjustment of the actuation element relative to the adapter element in order to place an engagement means, which is inserted into the longitudinal groove, into engagement with the undercut in a shape-matched and force-transmitting manner. This embodiment has the advantage that the clamping of the securing apparatus at the load bed can generally be realized without a housing for the adapter element, and therefore the housing can be dispensed with.

The at least one engagement means can have, by way of example, the shape of a C section, whose one end can be inserted into the longitudinal groove in order to engage behind the undercut, and whose other end engages with a groove of the adapter element. In accordance with an embodiment, the adapter groove is formed in a complementary manner to the C section, for example, substantially L-shaped, such that the engagement means can be moved relative to the adapter element merely by means of a displacement along the adapter groove. Alternatively, the adapter groove can be so generously dimensioned with respect to the C section that the engagement means can rotate within the groove in order to be brought out of its insertion position and into its engagement position and vice versa.

In order to prevent that the engagement means sitting in the adapter groove is accidentally released, it is advantageous to provide a means for the securing of the engagement means which has been inserted into the adapter groove.

By way of example, such a securing means can comprise a securing pin which extends through the adapter element, transversely with respect to the adapter groove, and in this connection reaches through a corresponding bore in the C section.

In accordance with a further variant, the securing means can comprise a threaded bore which leads laterally into the adapter element and merges into a through bore having a smaller diameter, said through bore extending up to the adapter groove and supporting a ball, which can partially escape from the through bore and engage in a depression of the engagement means, which is formed in a complementary manner to the ball. The ball is preferably biased by means of a spring, which is held by means of a threaded pin screwed into the threaded bore.

Alternatively, it is possible to close off a housing, in which the adapter element is received and which is formed in the manner of a U section extending in the direction of the longitudinal groove, and whose end faces face in the direction of the longitudinal groove, at its end faces from above by means of plates to such an extent that the plates partially cover the end faces of the adapter groove and secure the engagement means which have been inserted into the adapter groove in the adapter groove when the housing sits on the load bed, and releases the adapter groove and the engagement means which has been inserted into the adapter groove when the actuation element is released and the housing is sufficiently lifted with respect to the adapter element.

An embodiment is also conceivable in which the adapter element is fully surrounded by the housing with the exception of its bottom side, which faces the load bed. However, in this case, the housing must be lifted further than in the previous variant in order to insert the engagement means into the adapter groove or to remove the engagement means from the adapter groove.

An embodiment is even theoretically imaginable in which the adapter element is received in a housing configured in the manner of a U section in such a way that the end faces of the adapter element, at which the engagement means are inserted into or removed from the adapter groove, are closed off by the shanks of the U section. However, in this embodiment, the undercut of the load bed must have a particular stability, since the opposing force exerted by the housing translated into the force exerted by the engagement means is exerted on the undercut when the clamping mechanism is activated.

A further possibility for the securing of the engagement means in the adapter grooves lies in the use of a screw for the actuation element, for example a T-screw. In this connection, the corresponding nut thread in the adapter element partially extends into the horizontal shank of the substantially L-shaped adapter groove. Correspondingly, an opening is located approximately at mid-height of the upper shank of the engagement means which is formed in the manner of a C section. The length of the threaded section of the screw is dimensioned such that in the tightened state, the screw engages with the opening of the engagement means and secures it and simultaneously ensures the clamping of the engagement means at the undercut of the longitudinal groove.

In accordance with an alternative embodiment, which enables the insertion of the securing apparatus at any arbitrary position in the longitudinal groove, a first engagement means is formed as one piece with the adapter element, and a second engagement means is attached to the adapter element in a pivotable and/or displacable manner. By means of the ability to pivot and/or displace the second engagement means, a minimum mobility of the engagement means is provided, which is required in order to be able to insert the engagement means at an arbitrary position in the longitudinal groove, independently of a cut-out of the longitudinal groove.

At least one spring element is advantageously arranged in the adapter element in order to force the second engagement means into engagement with an undercut of the longitudinal groove. In other words, the spring element ensures that after the second engagement means is completely inserted into the longitudinal groove, it is automatically brought into a position in which it engages behind an undercut which is associated with it. Even if contrary to expectation, the spring element fails, the engagement of the second engagement means at the undercut is still ensured, since the housing for the receiving of the adapter element opposes the moveable second engagement means with sufficient resistance.

In order to be able to place the second engagement means into a position in which it releases the associated undercut for the insertion of the securing apparatus into the longitudinal groove or for the removal of the securing apparatus from the longitudinal groove, the housing for the receiving of the adapter element is preferably provided with an opening via which the engagement means is accessible from the outside.

A further embodiment which enables the insertion of the securing apparatus at an arbitrary position in the longitudinal groove consists of moving two engagement means, which are movably supported in or at the adapter element in the manner of a scissor mechanism, out of the insertion position and into the engagement position. Such a scissor mechanism can be pressed together, for example against a compression spring, for the insertion into the longitudinal groove, and then expands within the longitudinal groove in order to engage the engagement means with the undercut of the longitudinal groove and to fixedly clamp the securing apparatus in the longitudinal groove.

Figure 2:
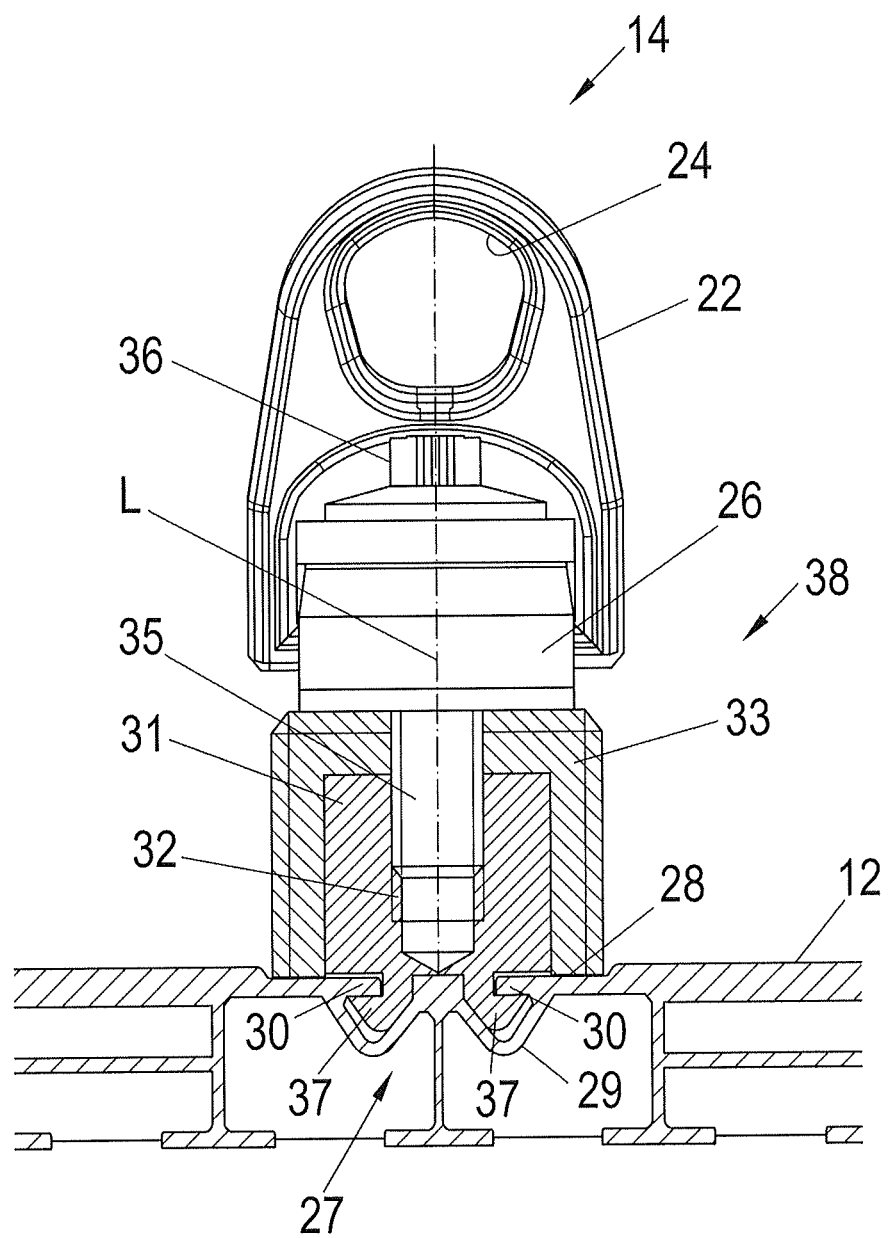
Figure 3:
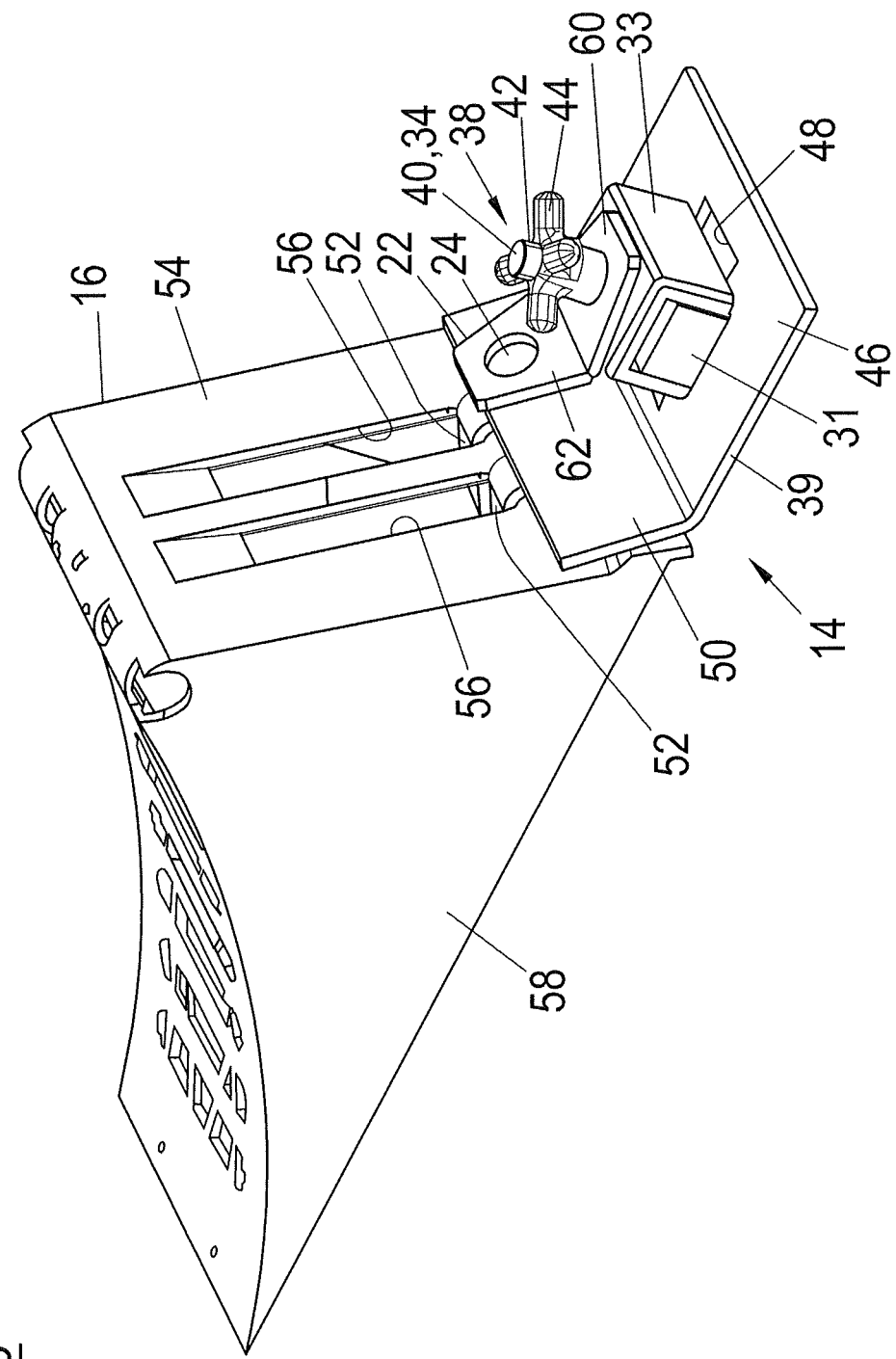
Figure 4:
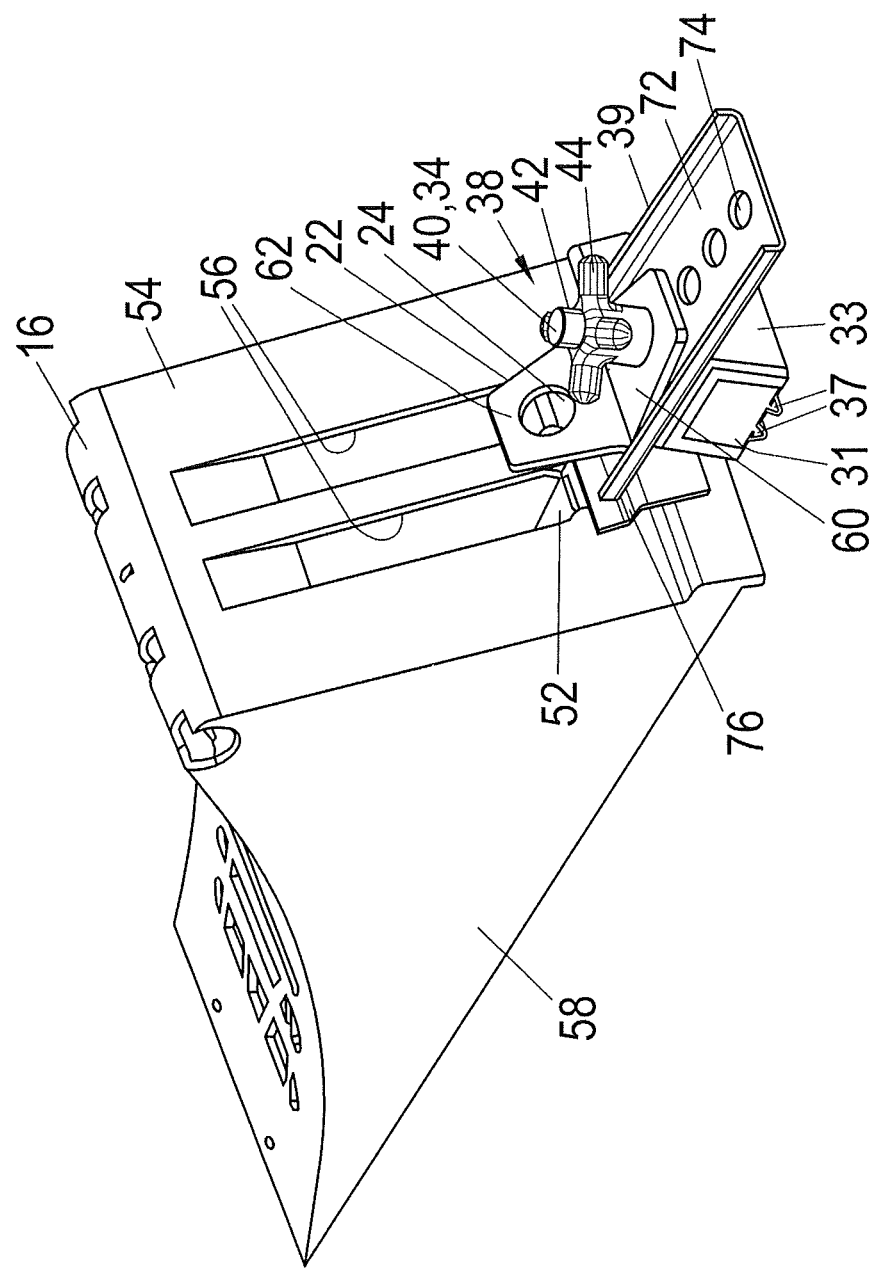
Figure 5:
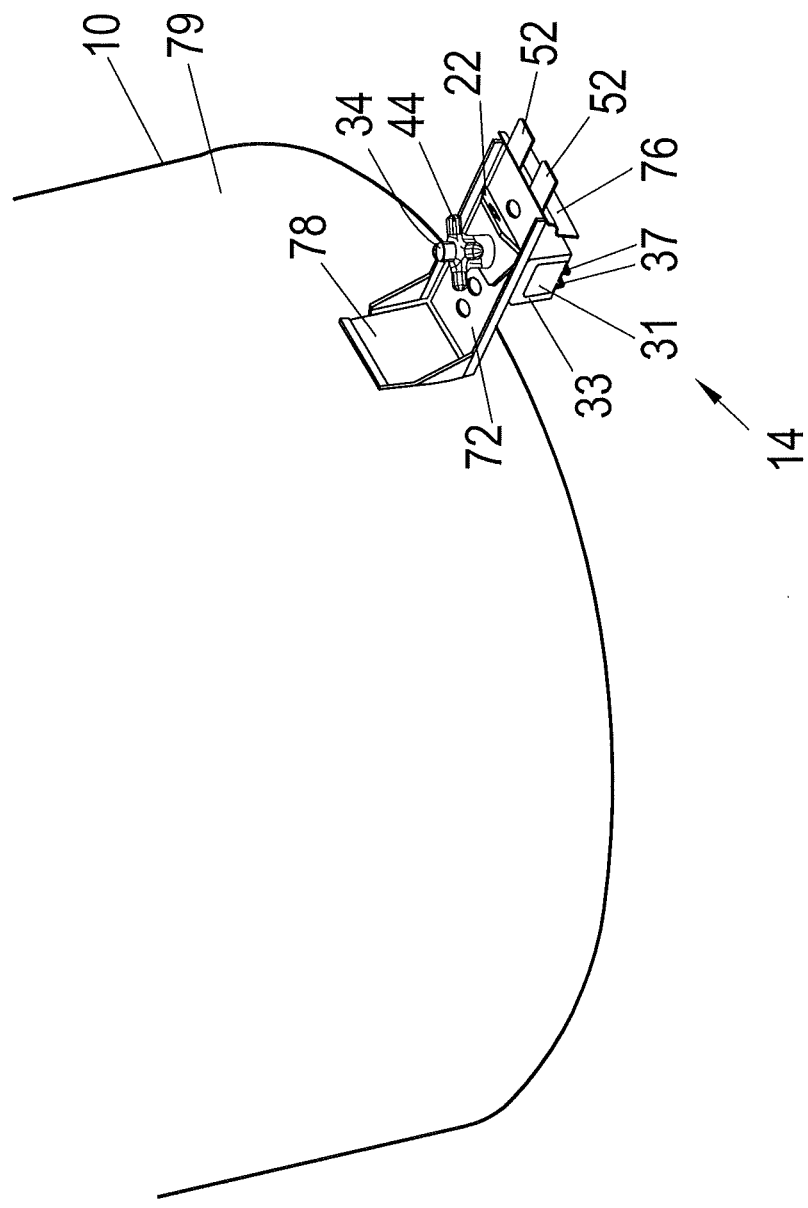
Figure 6A:
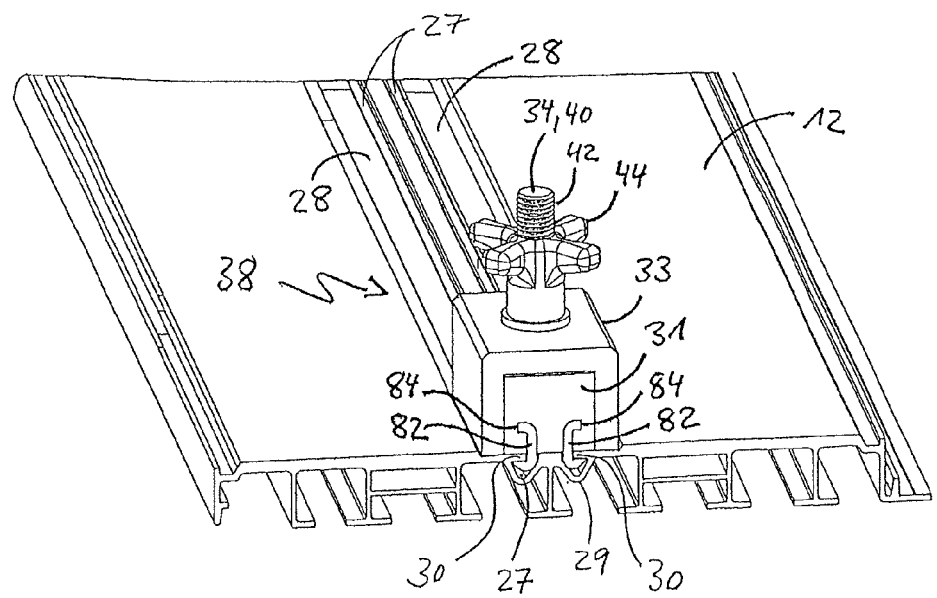
Figure 7A:
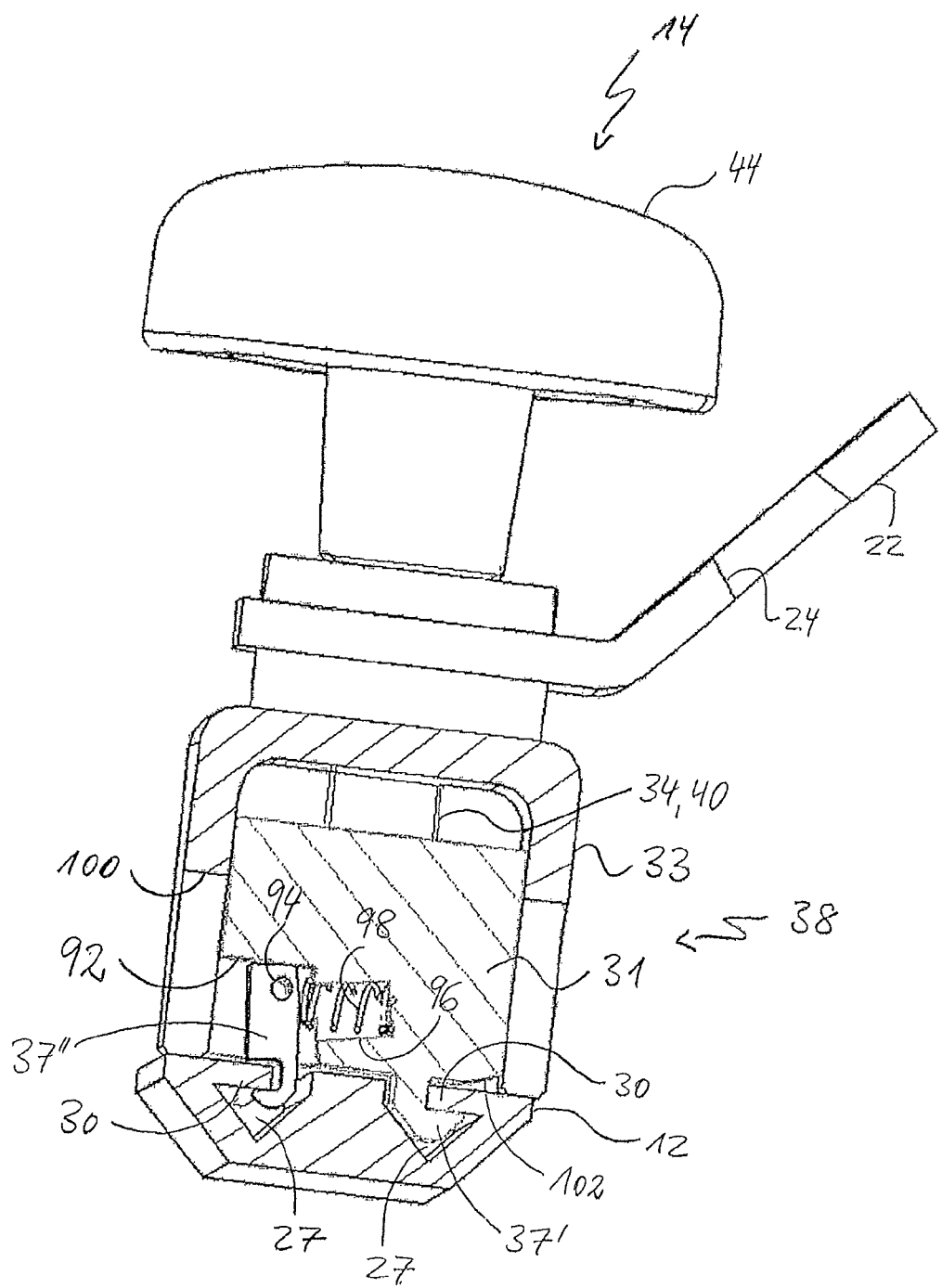
Figure 7B:
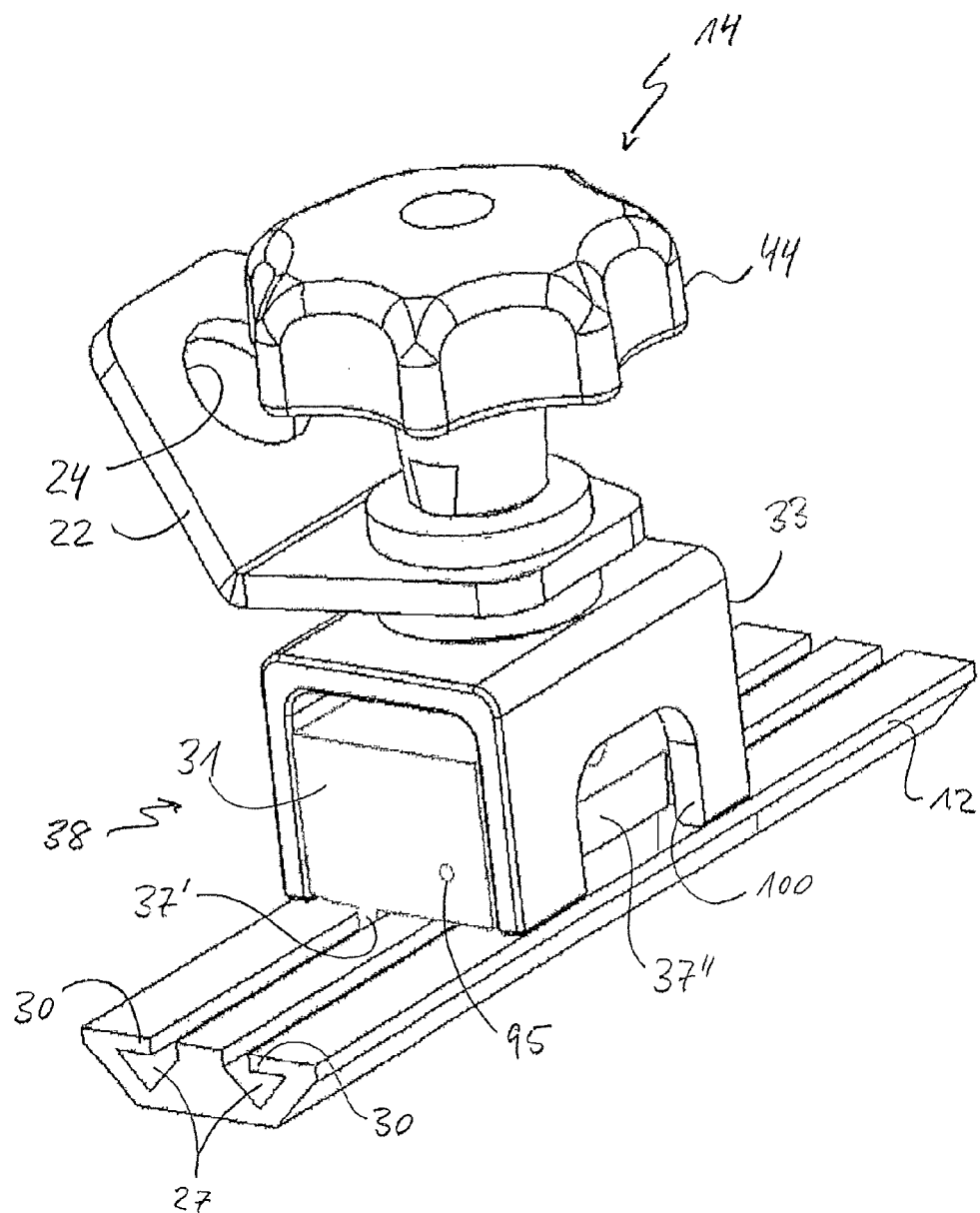
Figure 12:
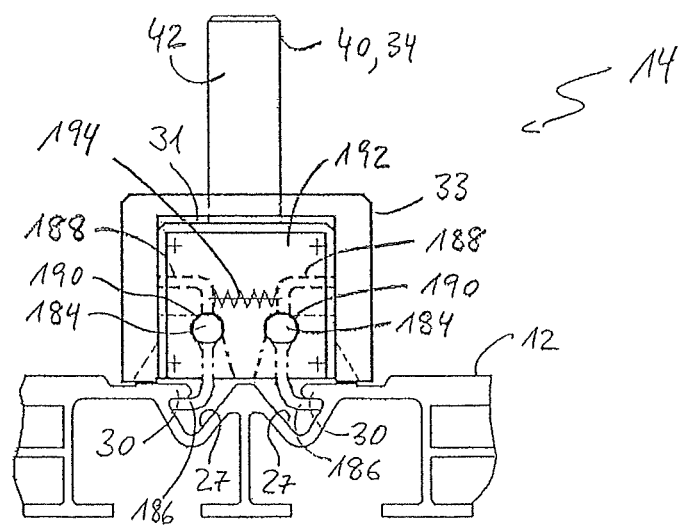
Figure 13:
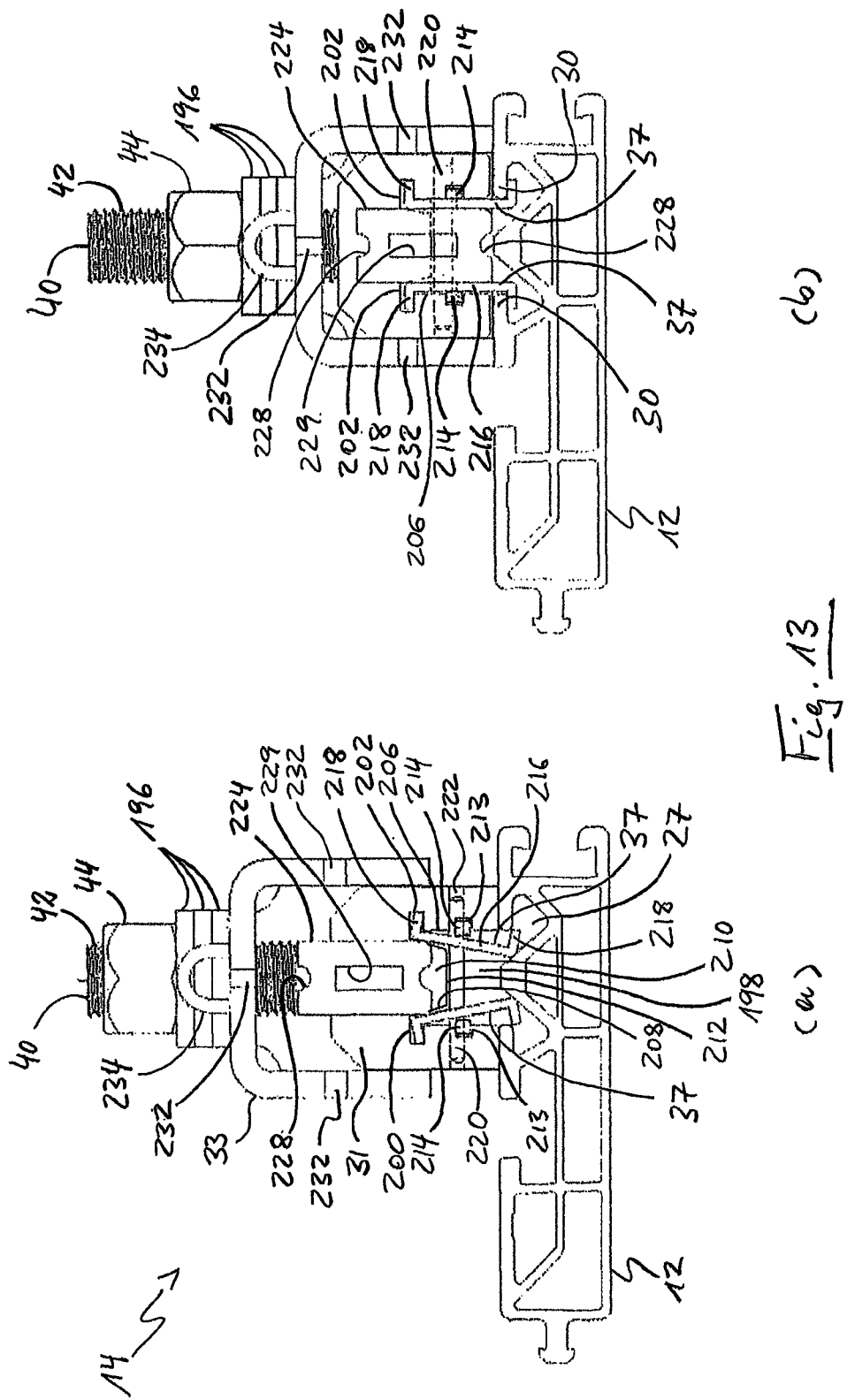
Figure 15:
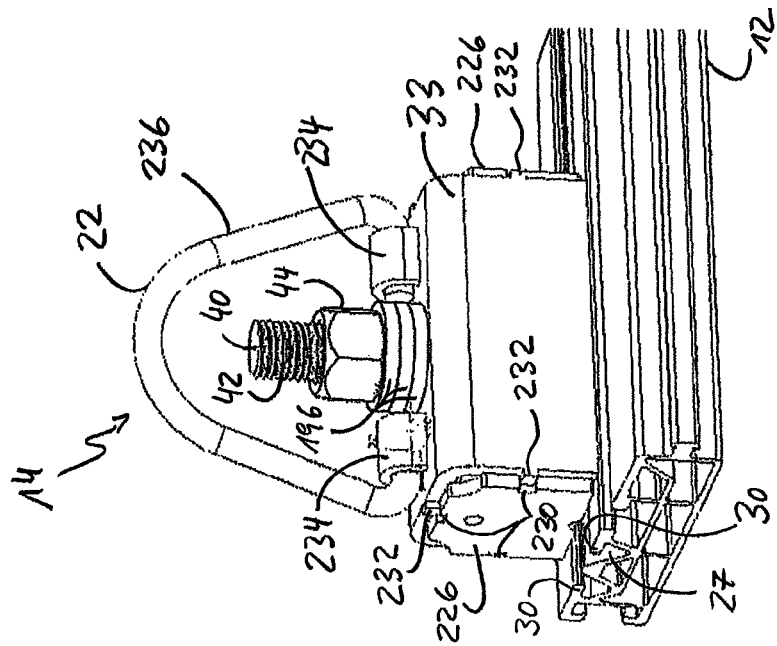
Figure 14:
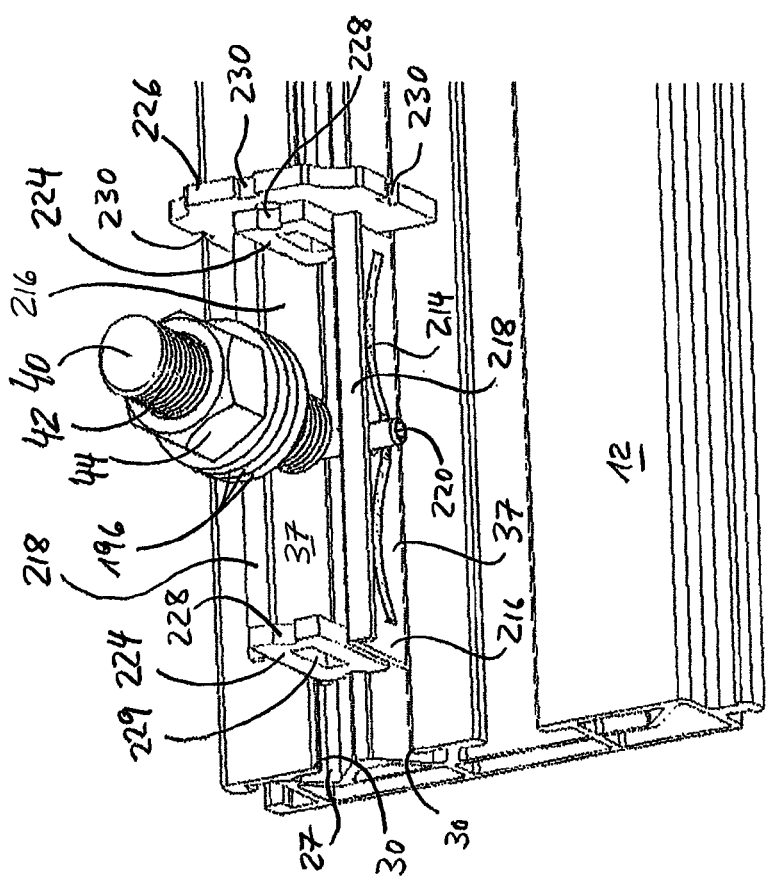

In the following, different embodiments of the invention will be described purely by way of example with reference to the submitted drawing. The Figures of the drawing show:

FIG. 1 a cross sectional view of a paper roll which is secured by means of a lashing strap and wheel chocks, which are secured at a load bed by means of securing apparatus in accordance with an embodiment of the invention;

FIG. 2 a cross sectional view of one of the securing apparatus in accordance with FIG. 1;

FIG. 3 a perspective view of a further embodiment of a securing apparatus in accordance with the invention and having a wheel chock;

FIG. 4 a perspective view of a further embodiment of a securing apparatus in accordance with the invention and having a wheel chock;

FIG. 5 a perspective view of an embodiment of a securing apparatus in accordance with the invention for the securing of a paper roll without a wheel chock;

FIGS. 6a and b perspective views of a clamping mechanism of a securing apparatus in accordance with a further embodiment of the invention;

FIG. 7 (a) a partial sectional view and (b) a perspective view of a securing apparatus in accordance with a further embodiment of the invention;

FIG. 8 (a) and (b) vertical sectional views, (c) a side view and (d) a horizontal sectional view of a securing apparatus in accordance with a further embodiment of the invention;

FIG. 9 (a), (d) side views and (b), (c), (e)-(g) different sectional views of a securing apparatus in accordance with a further embodiment of the invention;

FIGS. 10a and b side views of a variant of the embodiment in accordance with FIG. 9;

FIG. 11 a side view of a variant of the embodiment in accordance with FIG. 9;

FIG. 12 a side view of a securing apparatus in accordance with a further embodiment of the invention;

FIG. 13 front views of a securing apparatus in accordance with a further embodiment of the invention (a) prior to a clamping at the load bed and (b) in the clamped state;

FIG. 14 a partial perspective view of the securing apparatus in accordance with FIG. 13 in the clamped state; and FIG. 15 a perspective outer view of the securing apparatus in accordance with FIG. 13 in the clamped state.

FIG. 1 shows a paper roll 10 which lies on a load bed 12, for example in a container (e.g. a shipping container) or of a transport vehicle, and which paper roll 10 is secured at each opposite side by means of a commercially available wheel chock 16. Each wheel chock 16 is secured at the load bed 12 by means of a securing apparatus 14. The paper roll 10 is additionally secured by means of a lashing strap 18 which comprises lashing hooks 20 at its ends, which are hooked into eyes 24 of anchoring elements 22 of the securing apparatus 14.

As FIG. 2 shows, each securing apparatus 14 is in engagement with one of a plurality of longitudinal grooves 27 of the load bed 12, which grooves extend in a longitudinal direction of the container or of the transport vehicle. In the embodiment illustrated in FIG. 1, the paper roll 10 lies transversely with respect to the longitudinal direction of the container or of the transport vehicle such that the illustrated securing apparatus 14 both sit in the same longitudinal groove 27. However, the paper roll 10 could also be oriented in the longitudinal direction of the container or of the transport vehicle, in which case the securing apparatus 14 would be in engagement with different longitudinal grooves 27.

The longitudinal groove 27 illustrated in FIG. 2 has a W-shaped groove floor 29 when viewed in cross-section having undercuts 30, which are arranged opposite with respect to one another, partially projecting at its top side. This means that the present longitudinal groove 27 is a so-called W-groove. However, the longitudinal groove 27 could also alternatively be formed as a T-groove or as another suitable shape.

The top sides of the undercuts 30 and the regions of the top side of the load floor 12 adjoining the top sides of the undercuts 30 define groove surroundings 28. Furthermore, the longitudinal groove 27 is provided with a non-shown groove cut-out for the insertion of load securing elements, such as the securing apparatus 14 described here.

The securing apparatus 14 comprises a housing 33 in the shape of a U section that opens in a downwards direction, in which housing 33 an adapter element 31 is movably received, which adapter element 31 can be pulled into or pushed out of the housing 33 by means of an actuation element 34. In the present embodiment, the actuation element 34 is a hexagonal screw 35 which is in engagement with a threaded bore 32 of the adapter element 31 and which projects upwards from the housing 33 such that a head 36 of the screw 35 can be actuated from the outside.

The adapter element 31 comprises two hook-shaped engagement means 37 at its bottom side, which faces away from the housing 33, which engagement means 37 are formed as one piece with the adapter element 31 and which engagement means 37 are shaped such that they engage behind the undercuts 30 when they are inserted into the longitudinal groove 27.

Together, the housing 33, the adapter element 31 and the screw 35 form a clamping mechanism 38 for the clamping of the securing apparatus 14 at the load bed 12. For this purpose, the engagement means 37 are initially inserted into the longitudinal groove 27 via the groove cut-out. Then, the securing apparatus 14 is displaced along the longitudinal groove 27 until the required position is reached. Subsequently, the adapter element 31 is moved into the housing 33 by a tightening of the screw 35 at the screw head 36, by means of which the engagement means 37 are brought into engagement with the undercuts 30. In this connection, the housing 33 supports itself at the groove surroundings 28, this means that the load bed 12 is clamped between the engagement means 37 of the adapter element 31 and the housing 33, and the securing apparatus 14 is secured at the load bed 12 in this way.

Between the screw head 36 and the top side of the housing 33, the screw 35 is surrounded by a socket 26 which is rotatably supported about the longitudinal axis of the screw 35. The anchoring element 22 having the eye 24 for the receiving of a lashing hook 20 is supported at the socket 26, and indeed such that it can be pivoted about an axis, which is oriented perpendicular to a longitudinal axis L of the screw 35.

As can be seen in FIG. 1, the securing apparatus 14 comprises a fixing element 39 which is formed as one piece with the housing 33, and which fixing element 39 is in engagement with the wheel chock 16 associated with it in order to secure the wheel chock 16 when the securing apparatus 14 is clamped at the load bed 12. For this purpose, the fixing element 39 can be provided with finger or tongue sections which mesh (or engage) with recesses 56 at the rear side 54 of the wheel chock 16 or which catch hold of the opposite side surfaces 58 of the wheel chock 16 (cf FIG. 3).

Should a wheel chock 16 that is to be secured not comprise any recesses 56, or should the wheel chock 16 be so wide that it cannot be encompassed by the finger or tongue sections, then the fixing element 39 can alternatively or additionally also comprise a shank section which is oriented at an angle and which can be brought into contact at the rear side 54 of the wheel chock 16 in order to secure the wheel chock 16, and which shank section presses the wheel chock 16 to the load bed 12 when the securing apparatus 14 is clamped to the load bed 12.

A further embodiment of the securing apparatus 14 is shown in FIG. 3. The clamping mechanism 38 of this embodiment is generally similar to the clamping mechanism described by means of FIG. 2 with the difference that the actuation element 34 is not formed by a screw 35 in this example, but rather by a threaded bolt 40, which comprises a thread 42 at its accessible upper end. A nut 44, which can be tightened by hand, is engaged with the thread 42 in order to actuate the actuation element 34, and is a T-nut or a star nut in the present embodiment. The other end of the threaded bolt 40 is fixedly connected to the adapter element 31 in a suitable manner, for example by means of screwing, bolting, gluing or welding.

A further difference to the embodiment of FIG. 2 lies in the fact that the fixing element 39 of the securing apparatus 14 of FIG. 3 is formed by a separate angled plate comprising a first horizontal plate section 46 arranged between the load bed 12 and the housing 33 and a sloping or upward projecting second plate section 50, whose slope is substantially adapted to the slope of the rear side 54 of the wheel chock 16, and which second plate section 50 lies at the rear side 54 of the wheel chock 16 in order to press the wheel chock 16 to the load bed 12 when the securing apparatus 14 is clamped at the load bed 12. An anti-slip mat can be glued at a bottom side of the horizontal first plate section 46.

The horizontal first plate section 46 comprises a recess 48 through which the adapter element 31 of the clamping mechanism 38 can engage with the longitudinal groove 27 of the load bed 12. At the same time, the recess 48 is dimensioned such that the housing 33 sits at least partially on the top side of the horizontal first plate section 46 such that the horizontal first plate section 46, and in this way the fixing element 39 and the thereby fixed wheel chock 16, are clamped at the load bed 12 when the nut 44 is tightened. The recess 48 is designed such that the horizontal first plate section 46 can also be arranged rotated by 90° relative to the clamping mechanism 38 in order to enable a securing of paper rolls oriented both laterally and transversely with respect to the longitudinal groove 27. The recess 48 can generally also be designed such that a 360° rotation of the horizontal first plate section 46 relative to the clamping mechanism 37 is possible, preferably at an arbitrary angle.

As can be seen in FIG. 3, two finger sections 52 project from the second plate section 50 and which engage with recesses 56 at the rear side 54 of the wheel chock 16. Alternatively or additionally, the second plate section 50 can comprise tongue sections (not shown), which catch hold of opposite side surfaces 58 of the wheel chock 16 in order to secure the wheel chock.

A further difference to the embodiment of FIG. 2 lies in the fact that the anchoring element 22 of the embodiment illustrated in FIG. 3 is formed by a bent piece of sheet metal comprising a first sheet metal section 60 and a second sheet metal section 62. The first sheet metal section 60 is oriented at least approximately horizontally while the second sheet metal section 62 projects upwards at an angle from the first metal sheet section 60 and comprises the previously mentioned eye 24 for the receiving of a lashing hook 20.

The first sheet metal section 60 is arranged between the housing 33 and the nut 44 and is provided with a bore, which is not shown, and through which the threaded bolt 40 extends having a slight tolerance. The anchoring element 22 is secured to the housing 33 by tightening the nut 44.

FIG. 4 shows a further embodiment of the securing apparatus 14 which differs from the embodiment of FIG. 3 only with respect to the design of the fixing element 39. In this way, the fixing element 39 of the embodiment illustrated in FIG. 4 is arranged not between the housing 33 and the load bed 12, but rather at the top side of the housing 33, between the housing 33 and the nut 44 which can be tightened.

Specifically, a horizontal section 72 of the fixing element 39 is formed by a U section that opens in an upward direction and at whose floor (base) a plurality of bores 74 are arranged spaced apart one another when viewed in the longitudinal direction of the section. These bores 74 serve for the reception of the threaded bolt 40 and are adapted to the diameter of the threaded bolt 40 such that the fixing element 39 can be rotated about the threaded bolt 40.

At one end of the horizontal section 72, a step-like, angled sheet metal section 76 is formed which is adapted to the rear side 54 of the wheel chock 16 in order to press the wheel chock 16 to the load bed 12 when the clamping mechanism 38 is tightened; furthermore, two finger sections 52 project from the sheet metal section 76 and mesh with the recesses 56 at the rear side 54 of the wheel chock 16.

The anchoring element 22 of this embodiment is designed like in conjunction with FIG. 3 and is arranged between the horizontal section 72 of the fixing element 39 and the nut 44.

FIG. 5 illustrates a further embodiment of the securing apparatus 14 that differs from the embodiment shown in FIG. 4 only in the fact that the horizontal section 72 of the fixing element 39 additionally comprises a shank section 78 at the end of the horizontal section 72 which is remote from the step-like, angled sheet metal section 76, and which shank section 78 extends perpendicularly upwards and enables a direct securing, for example of a paper roll 10 which is standing upright, in that the shank section 78 is brought up against a jacket surface 79 of the paper roll 10.

FIG. 6 shows an alternative embodiment of a clamping mechanism of a securing apparatus 14 which can comprise an anchoring element 22 and/or a fixing element 39 and/or any other arbitrary load securing means, and which with respect to the previous embodiments has the particular advantage that the clamping mechanism can be inserted into the longitudinal groove 27 at an arbitrary location of the longitudinal groove 27 independently of the groove cut-out.

Figure 6B:
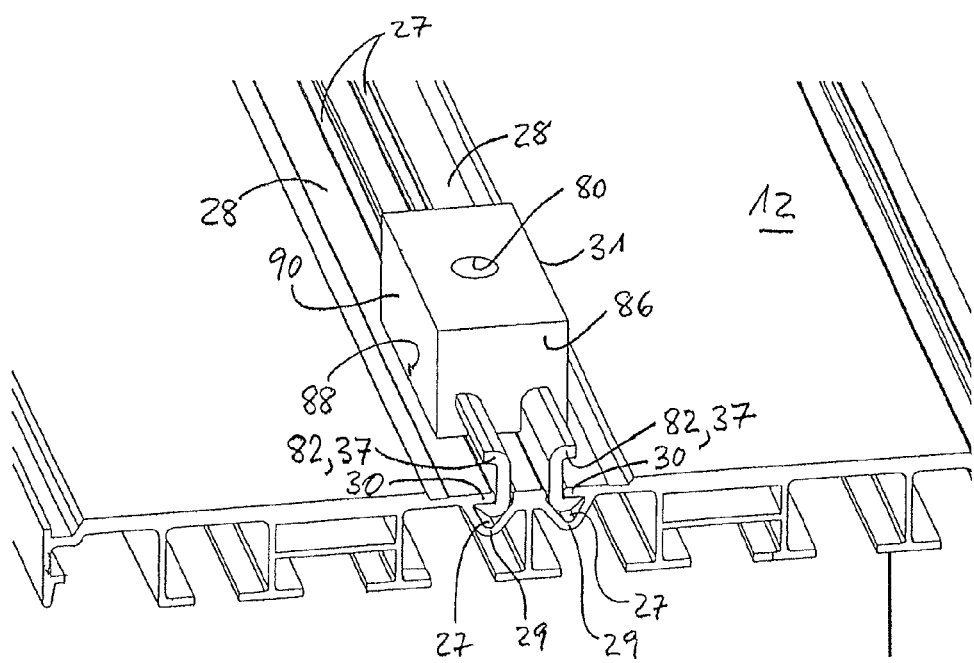

The clamping mechanism of FIG. 6 is similar to the clamping mechanisms illustrated in FIG. 4 and FIG. 5 to the extent that the clamping mechanism comprises an adapter element 31 that is received in a U section-like housing, and an actuation element 34 in the form of a threaded bolt 40, whose accessible upper end is provided with a thread 42, and whose other end sits in a bore 80 (FIG. 6b) of the adapter element 31 and is fixedly connected to the adapter element 31 in this way, for example by means of screwing, bolting, gluing or welding. A nut 44, which can be tightened by hand, is engaged with the thread 42 of the threaded bolt 40 in order to actuate the actuation element 34, and is a star nut in the illustrated embodiment.

In contrast to the previous embodiments, the engagement means 37 of the embodiment shown in FIG. 6 are not formed as one piece with the adapter element 31, but rather as two separate components having the shape of C sections 82. The connection of the C sections 82 to the adapter element 31 takes place by means of two substantially L-shaped adapter grooves 84, which are formed complementary to the C sections 82 and which extend in parallel with respect to one another through the adapter element 31 from a first end face 86 of the adapter element 31 to an opposite second end face.

To install the securing apparatus 14 at the load bed 12, the C sections 82 are first inserted into the longitudinal groove 27 and then inserted into the adapter grooves 84 (FIG. 6b). Subsequently, the adapter element 31 is moved over the C sections 82 until they are completely received in the adapter element 31 (FIG. 6a).

Two bores 88 which extend from opposite outer sides 90 of the adapter element 31 to the nearest adapter groove 84 transversely with respect to the longitudinal extent of the adapter grooves 84 are provided for the securing of the C sections 82 in the adapter element 31. Each bore 88 comprises an external threaded section having a first diameter, in which a threaded pin is screwed, and an inner section having a smaller, internal second diameter, in which a ball is stored. The ball is urged inwards by means of a spring, which spring is supported at the threaded pin and engages in a correspondingly formed depression of the correctly positioned C section 82 that has been inserted into the adapter groove 84, whereby an accidental slipping out of the C section from the adapter groove 84 is at least made more difficult.

FIG. 7 shows a further embodiment of a securing apparatus 14 which, like the embodiment of FIG. 6, can be inserted into a longitudinal groove 27 at an arbitrary position along the longitudinal groove 27, independently of a groove cut-out of the longitudinal groove 27. In FIG. 7, the securing apparatus 14 is provided with an anchoring element 22, as has already been described by means of FIG. 3. However, the securing apparatus 14 of FIG. 7 can additionally or alternatively also comprise a fixing element 39 and/or any other arbitrary load securing means.

The clamping mechanism 38 of the securing apparatus 14 of FIG. 7 is similar to the clamping mechanism 38 illustrated in FIG. 6 to the extent that it comprises an adapter element 31 that is received in a U section-like housing 32 and an actuation element 34 in the form of a threaded bolt 40, whose accessible upper end is provided with a thread 42 (FIG. 6b) and whose other end sits in a bore 80 (FIG. 6b) of the adapter element 31 and is fixedly connected to the adapter element 31 in this way, for example, by means of screwing, bolting, gluing or welding. A nut 44, which can be tightened by hand, is engaged with the thread 42 of the threaded bolt 40 in order to actuate the actuation element 34, and is a T-nut in the illustrated embodiment.

In contrast to the previous embodiments, the adapter element 31 of the embodiment shown in FIG. 7 comprises a first engagement means 37', formed as one piece with the adapter element 31 in the manner according to FIG. 2, as well as a second engagement means 37", which is formed by a separate component and which is partially received in a recess 92 of the adapter element 31 which is opened downwards and to the side.

In the region of its upper end, the second engagement means 37" is hinged at the adapter element 31 pivotably about an axis parallel with respect to the longitudinal groove 27. For this purpose, the second engagement means 37" comprises a lateral bore 94 through which a pin of the adapter element 31, which is not shown, extends for the support of the second engagement means 37", and which pin is supported in corresponding support bores (FIG. 7b) of the adapter element 31.

At its lower end, the second engagement means 37" is formed in a hook shape corresponding to the first engagement means 37' in order to be able to engage behind the undercuts 30 of the longitudinal groove 27.

In the adapter element 31, two transverse bores 96 are also provided at opposite sides of the bore 80 (FIG. 6b) for the actuation element 34, and which transverse bores 96 open into the recess. Compression springs 98 which urge the second engagement means 37" outwards are arranged in the transverse bores 96.

A lateral housing opening 100 is provided in the housing 33, which is aligned with the recess 92 of the adapter element 31 and through which the second engagement means 37" is accessible from the outside and which enables the second engagement means 37" to pivot inwards against a restoring force of the compression springs 98.

The housing 32 is initially lifted relative to the adapter element 31 in order to insert the securing apparatus 14 into the longitudinal groove 27. Then, the adapter element 31 is placed onto the groove surroundings 28 at an angled position, meaning slightly tilted. In order to already enable a partial engagement of the first engagement means 37' with the longitudinal groove 27 in the tilted state, the adapter element 31 is provided with a chamfer 102 at a region at its bottom side which is opposite to the recess 92.

Subsequently, the securing apparatus 14 is set upright by means of a pivoting of the adapter element 31 about its point of support at the groove surroundings 28, and the engagement means 37' is turned into the associated undercut 30 in the longitudinal groove 27. Simultaneously, the second engagement means 37" is pushed inwards either manually or by means of a tool via the lateral housing opening 100, such that the second engagement means 37 can likewise be engaged with the longitudinal groove 27.

In the fully upright state of the securing apparatus 14, the second engagement means 37" is released from the outside such that the second engagement means 37" is then forced outwards by means of the compression springs 98 and engages in this way with the associated undercut 30, just like the first engagement means 37'.

Then, the adapter element 31 is drawn in relative to the housing 33 by means of actuating the nut 44 in the previously described manner and the securing apparatus 14 is clamped at the load bed 12 in this way.

FIG. 8 shows a further embodiment of a securing apparatus 14 which, like the embodiments of FIGS. 6 and 7, can be inserted into the longitudinal groove 27 at an arbitrary position along the longitudinal groove 27 independently of a groove cut-out of the longitudinal groove 27. In FIG. 8. the securing apparatus 14 is illustrated without a load securing means. However, as in the previous embodiments, this securing apparatus 14 can also be provided with an anchoring element 22, a fixing element 39 and/or any other arbitrary load securing means.

The clamping mechanism 38 of the securing apparatus 14 of FIG. 8 is similar to the previously described clamping mechanism 38 to the extent that it comprises an adapter element 31 that is received in a U section-like housing 33 and an actuating element 34 in the form of a threaded bolt 40, whose accessible upper section is provided with a thread 42 and whose lower section sits in a bore 80 of the adapter element 31 and is rotatably anchored in the bore 80, for example, by means of screwing. As previously described, the actuation of the actuation element 34 takes place by means of a nut 44 which can be tightened by hand and is in engagement with the thread 42 of the threaded bolt 40, which nut 44 is not illustrated and is, for example, a T-nut.

The adapter element 31 is provided at its bottom side, which faces the load bed 12, with two depressions 104 which extend in parallel with respect to the longitudinal groove 27 and each comprise a semicircular cross-section. In each depression 104, a bolt-shaped engagement means 37 is supported rotatably about the longitudinal central axis of each depression 104. The engagement means 37 each project somewhat beyond the end faces 106 of the adapter element 31 at both ends.

In order to prevent the engagement means 37 from falling out of the depressions 104, the U section-like housing 33 is closed at each end face by means of an end plate 108, which comprises two projections 110 at its lower edge that each partially reach under one of the engagement means 37 (FIG. 8c). The projections 110 are dimensioned such that they engage with the W-shaped longitudinal groove 27 in the installed state of the securing apparatus 14. In this connection, the projections 110 define a recess 112 between each other, which is adapted to a central web 114 of the W-shaped longitudinal groove 27.

Each of the engagement means 37 is manufactured from a cylindrical base body in which a lateral recess 116 has been introduced, which extends along the axial length of the base body and which provides the engagement means 37 with a hook-shaped cross-section. In this connection, the engagement means 37 are each dimensioned and arranged such that a lower part 118 of the engagement means 37 which bound the recess 116 can be rotated into the longitudinal groove 27 within its depression 104 and can engage behind an associated undercut 30 of the longitudinal groove 27.

In order to be rotated, each engagement means 37 is provided at its top side, which faces away from the lower part 118, with gear teeth 122 which match with a corresponding toothed rack 124, which extends in a corresponding bore 126 in the adapter element 31 both transversely with respect to a corresponding engagement means 37 as well as transversely with respect to the threaded bolt 40.

Figure 8A:
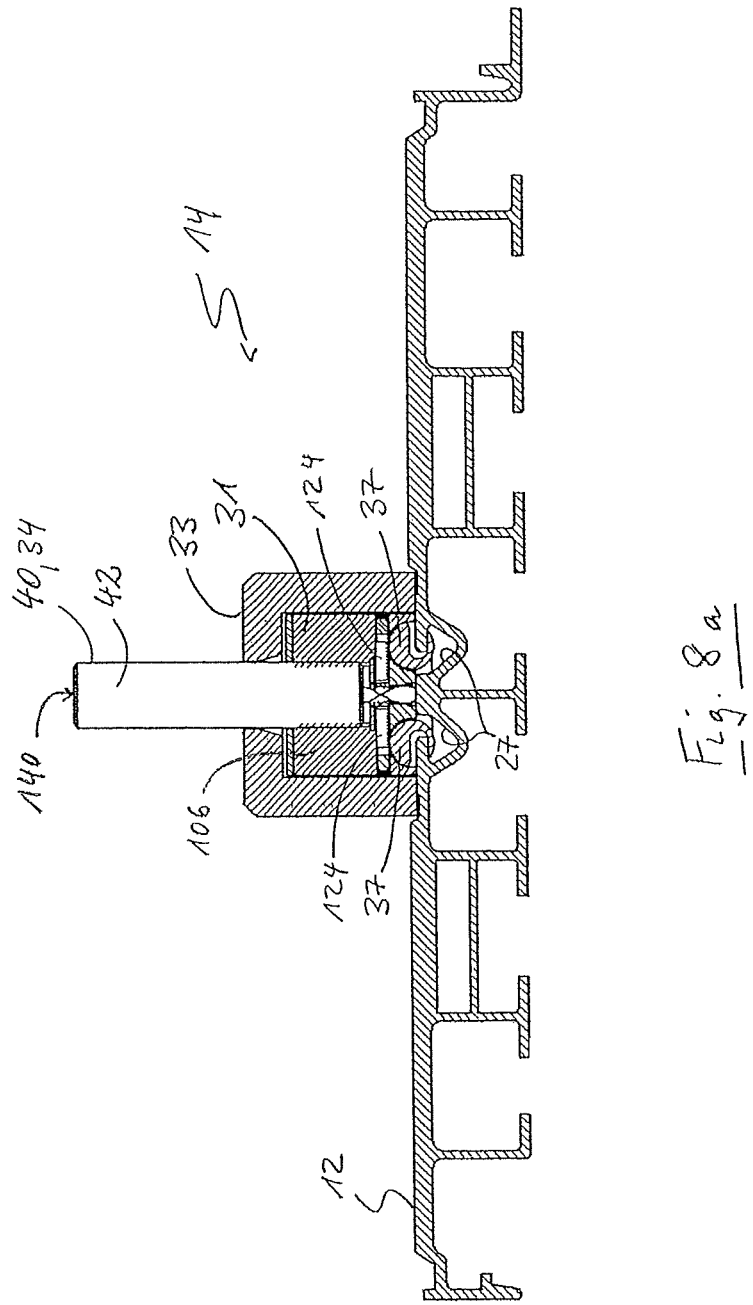
Figure 8B:
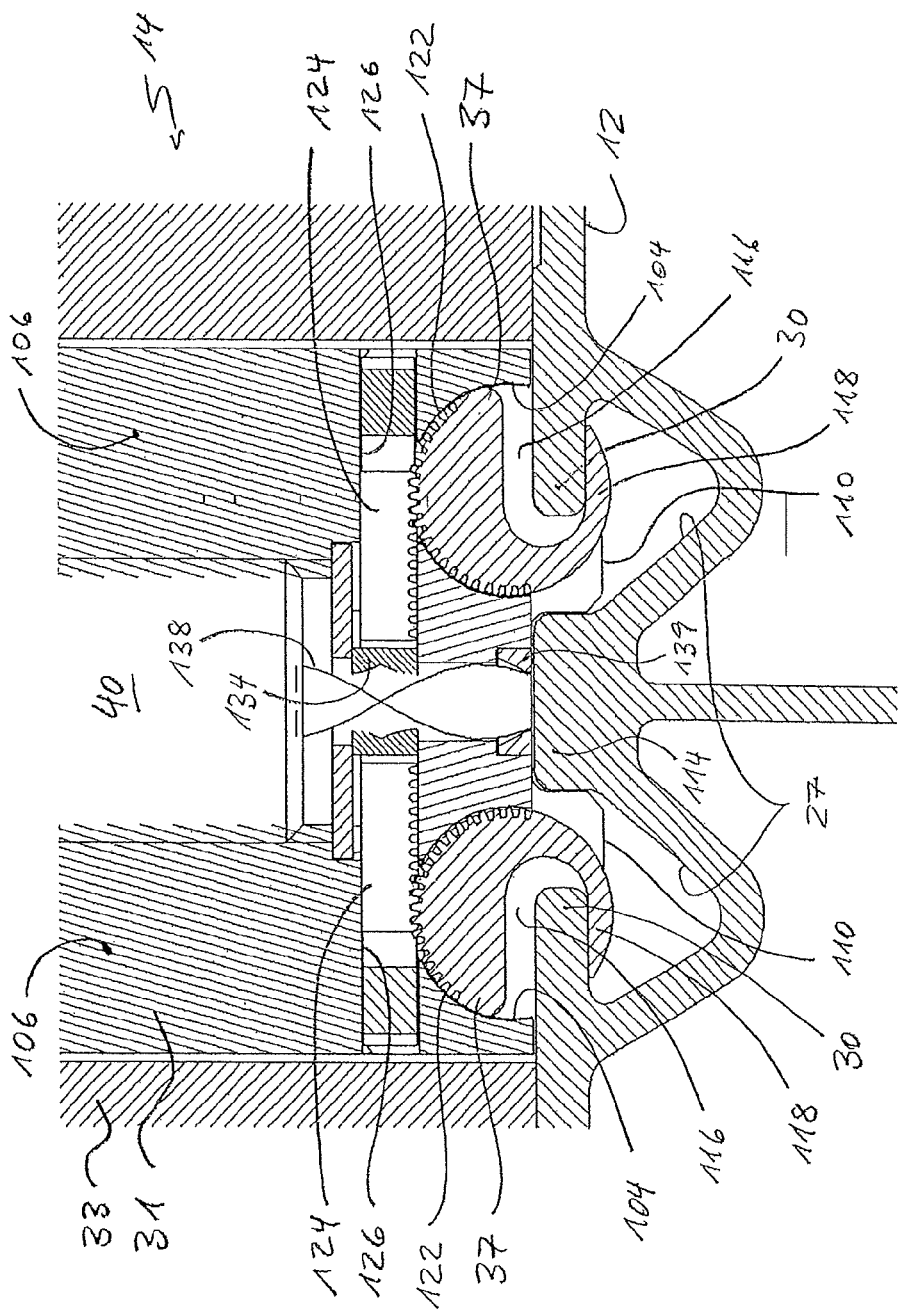
Figure 8D:
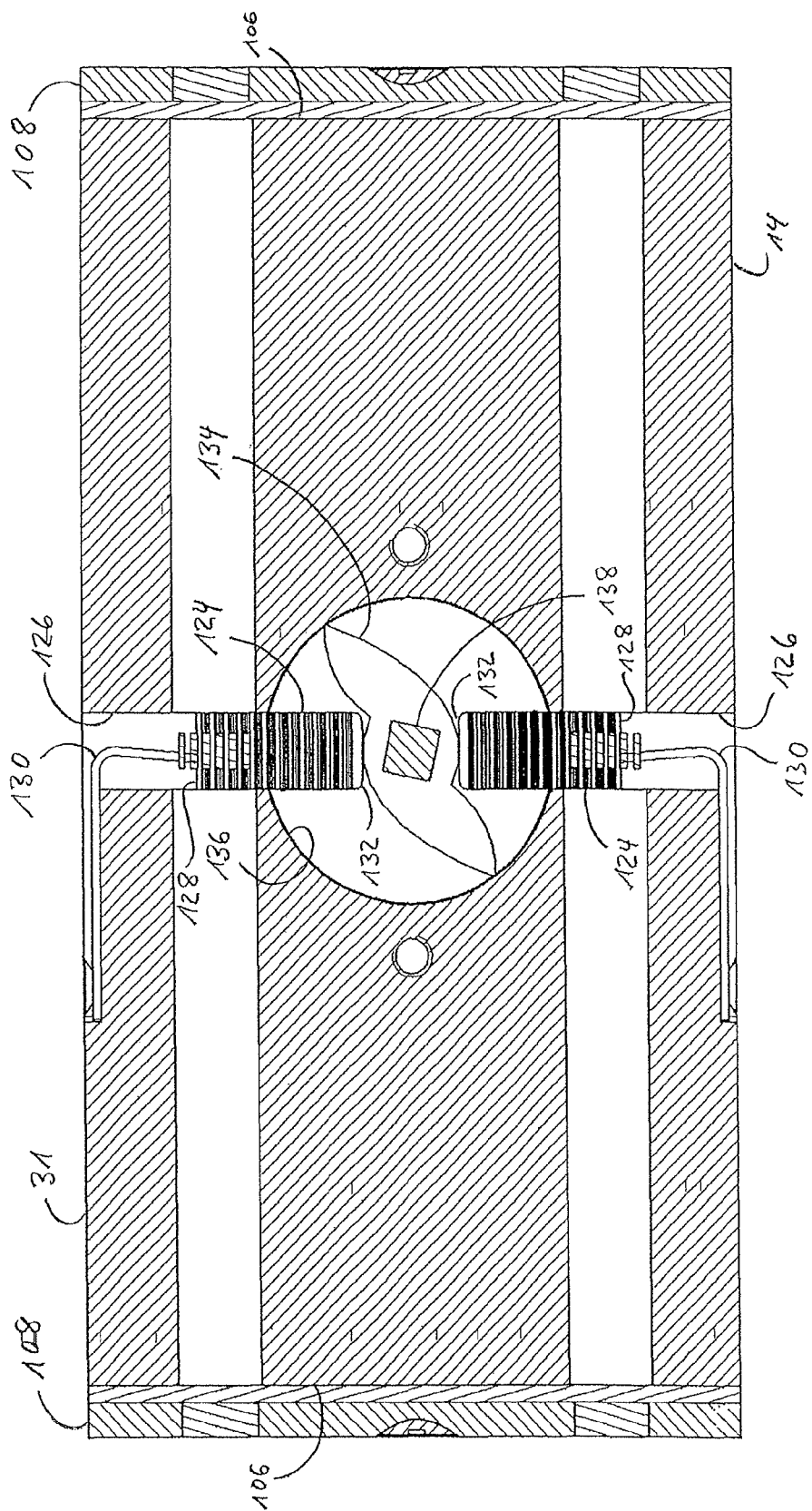

Each toothed rack 124 is biased inwards by means of a spring element 130 which catches hold of an outer end 128 of the toothed rack 124 (FIG. 8d). In contrast to this, inner ends 132 of the toothed racks 124 cooperate with a cam element 134, which is supported in a rotatable manner about an axis which is coaxial to the longitudinal central axis of the threaded bolt 40 in a corresponding recess 136 of the adapter element 31.

The cam element 134 sits in a rotationally secure manner on a twisted square rod 138 which sits in a square bore introduced at the lower end face of the threaded bolt 40 and therefore, the cam element 134 is connected to the threaded bolt 40 in a rotationally secure manner. A lower end of the square rod 138 is supported in a rotatable manner at a bottom side of the adapter element 31 in a support 139.

The rotation of the square rod 138, and therefore the rotation of the cam element 134, takes place by a rotation of the threaded bolt 40 relative to the adapter element 31. For this purpose, the threaded bolt 40 comprises a bit holder 140 at its upper end which, for example, can be formed for the holding of a hexagonal bit, I-star bits or Torx bits or other suitable bit shapes.

By means of a rotation of the cam element 134 in one direction, the toothed racks 124 can be moved outwards against the restoration force of the spring elements 130, while a rotation of the cam element 134 in the other direction enables a movement of the toothed racks 124 inwards, which movement is forced by the spring element 130.

An inward movement of the toothed racks 124 brings about a rotation of the engagement means 37 into the engagement position illustrated in FIGS. 8a and 8b, in which the lower parts 118 of the engagement means 37 engage behind the undercut 30, this means that the undercuts 30 are received in the recesses 116 of the engagement means 37.

In contrast to this, an outward movement of the toothed racks 124 brings about a rotation of the engagement means 37 into an insertion position, in which the lower parts 118 of the engagement means 37 release the undercuts 30 such that the engagement means 37 can be inserted into the longitudinal groove 27 or can be removed from the longitudinal groove 27.

The clamping of the securing apparatus 14 takes place in a similar manner to the clamping of the previous embodiments, by means of a tightening of the adapter element 31 relative to the housing 33 that surrounds the adapter element 31 and sits above the groove surroundings 28, this means by means of tightening the nut 44 which is threaded onto the upper thread section 42 of the threaded bolt.

However, it is also conceivable that the clamping of the adapter element 31 at the load bed 12 is realized by means of the square rod 138, in that the square rod 138 is moved downwards so far out of the adapter element 31 that it comes to rest on the central web 114 of the W-shaped longitudinal groove 27, and the adapter element 31 is thereby pressed upwards away from the load bed 12 while the engagement means 37 are simultaneously moved out of the insertion position and into the engagement position, such that the engagement means 37 are brought into engagement with the undercuts 30 of the longitudinal groove 27 in a shape-matched and force-transmitting manner. This manner of clamping would have the advantage that the clamping mechanism 38 would generally no longer require the housing 33, and in this way the housing 33 could be dispensed with.

FIG. 9 shows a further embodiment of a securing apparatus 14 which, like the embodiments of FIGS. 6 to 8, can be inserted into a longitudinal groove 27 at an arbitrary position along the longitudinal groove 27, independently of a groove cut-out of the longitudinal groove 27. The securing apparatus 14 is illustrated without a load securing means in FIG. 9. However, as in the previously described embodiments, it is understood that the securing apparatus 14 of FIG. 9 can also be provided with an anchoring element 22, a fixing element 39 and/or any other arbitrary load securing means.

The clamping mechanism 38 of the securing apparatus 14 of FIG. 9 is similar to the clamping mechanisms 38 illustrated in FIGS. 6 to 8 to the extent that the clamping mechanism comprises an adapter element 31 that is received in a U section-like housing 33 and an actuation element 34 in the form of a threaded bolt 40, whose lower section is screwed into a bore 80 of the adapter element 31. Like in the previous embodiment, the accessible upper section of the threaded bolt 40 is provided with a thread 42 onto which a nut 44 for the actuation of the clamping mechanism 38 is screwed, which nut 44 can be tightened by hand and is, for example, a T-nut.

The threaded bolt 40 is provided at its upper end face with a bit holder 140 (FIG. 9*b*). In the present embodiment, the bit holder 140 is formed for the receiving of a hexagonal bit. However, it is understood that the bit holder 140 can also be adapted to other bit shapes, for example, I-star bits or Torx bits. By inserting a corresponding tool into the bit holder 140, the threaded bolt 40 can be screwed deeper into the adapter element 31 or screwed out of the adapter element 31, this means that the threaded bolt 40 can be displaced upwards or downwards relative to the adapter element 31.

A guide beam 142 is connected in a rotatable manner to the lower end of the threaded bolt 40 via a vertical projection 144. The guide beam 142 extends transversely with respect to the threaded bolt 40, and therefore extends substantially in parallel with respect to the bottom side of the adapter element 31 from one end face 106 of the adapter element 31 to the other (FIG. 9*c*). The guide beam 142 is guided into a slot-shaped recess 148 of the adapter element and is displaced upwards by means of an upward displacement of the threaded bolt 41 moved downwards by means of a downwards displacement of the threaded bolt 40.

A plurality of transverse bolts 150 are arranged in a distributed manner along the guide beam 142, which transverse bolts 150 extend transversely with respect to both the guide beam 142 as well as with respect to the threaded bolt 40 and are supported in corresponding transverse openings 152 of the adapter element 31 such that they can be lifted or lowered together with the guide beam 142.

Figure 9E:
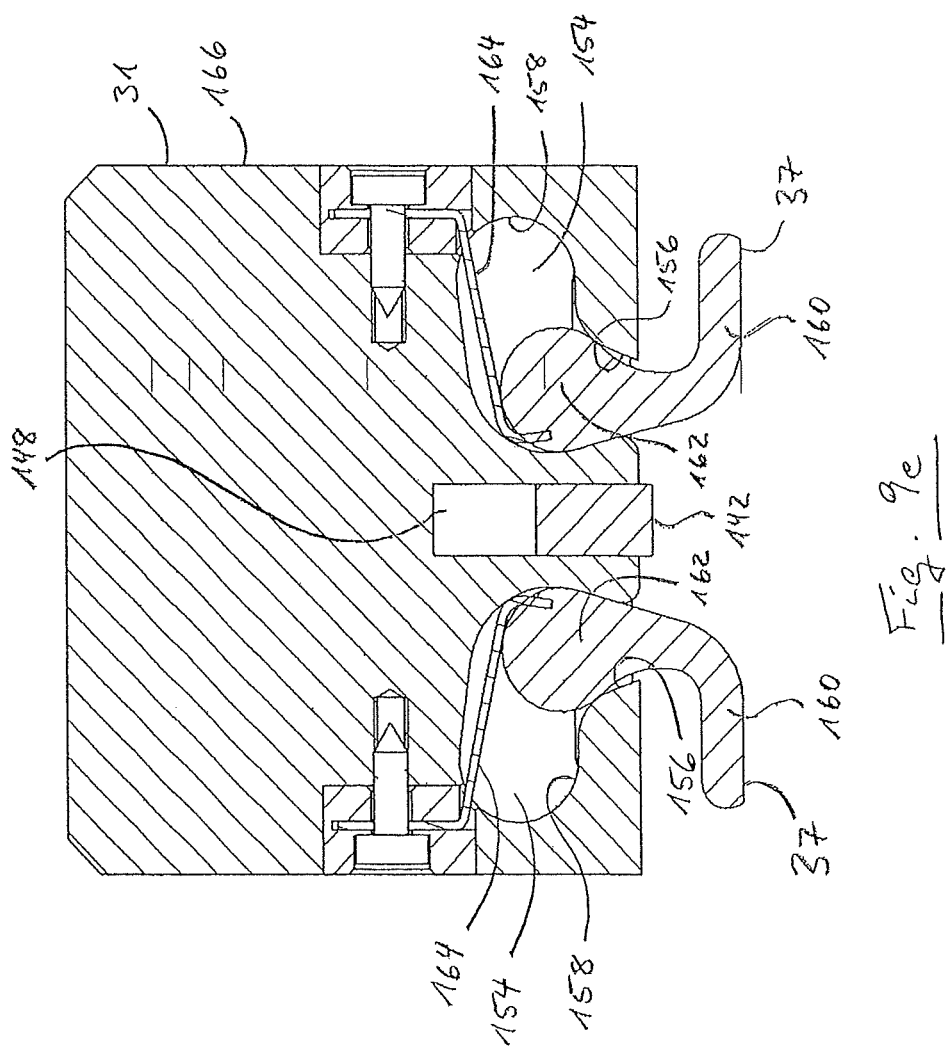
Figure 9C:
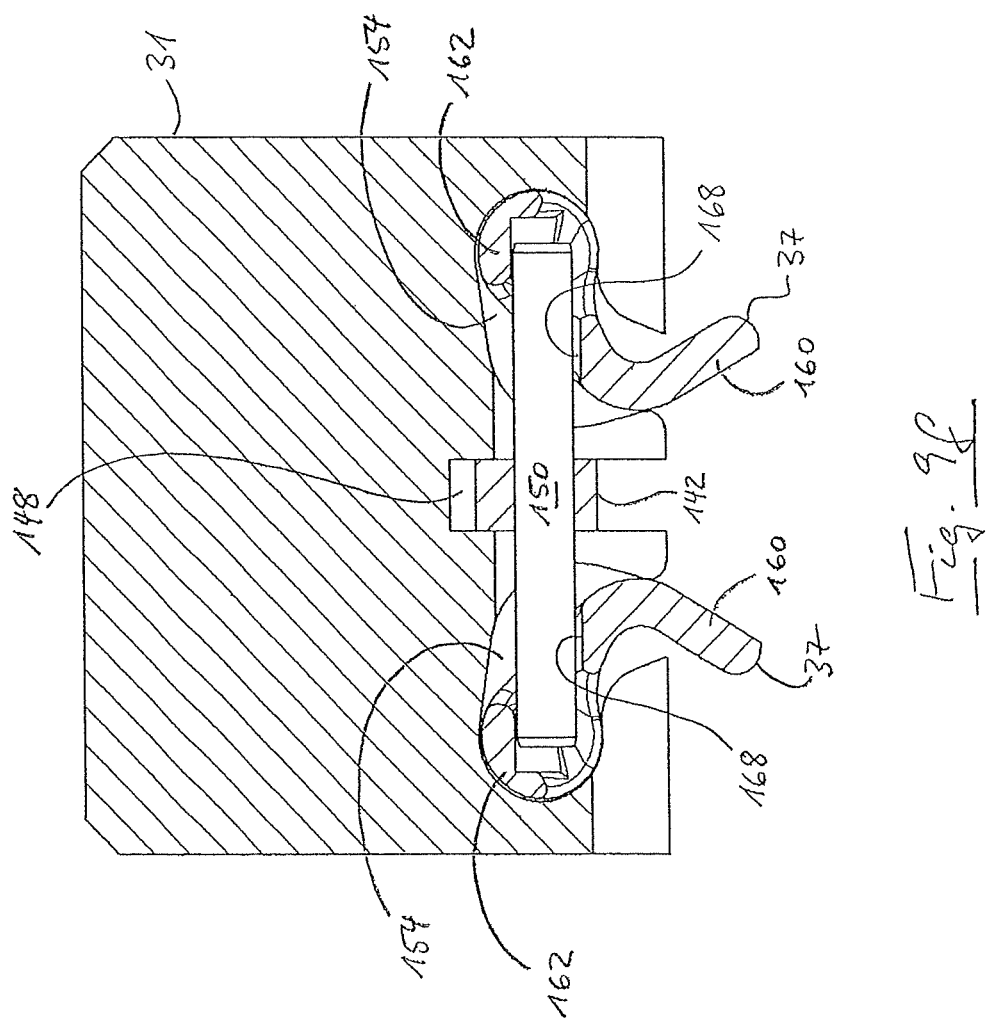

At the lower part of the adapter element 31, two moving block guides 154 are formed which extend at opposite sides of the lateral opening 148 in parallel with respect to the lateral opening 148 from an end face 106 of the adapter element 31 to the other (FIGS. 9*d* and 9*e*). Each of the moving block guides 154 comprises an active section 156 which is open to the bottom side of the adapter element 31 and a passive section 158 which points upwards slightly at an angle.

An engagement means 37 is movably supported at each moving block guide 154, which engagement means 37 extends from one end face 106 of the adapter element 31 to the other in the embodiment illustrated here. As seen in its cross-section, each engagement means 37 forms an approximately right-angled hook having an engagement shank 160, which projects out of the moving block guide 154 and can be inserted into the longitudinal groove 27 and brought into engagement with the undercut 30, and also having a guide shank 162 which is connected at the engagement shank 160 and guided into the moving block guide 154. In comparison to the engagement shank 160, the guide shanks 162 are formed in a reinforced manner such that they comprise a maximum width, which is larger than a minimum width of the active section 156 of the moving block guides 154, so that that the engagement means 37 cannot fall out of their moving block guides 154.

The contours of the moving block guides 154 and of the engagement means 37 are adapted to one another such that when the guide shanks 162 of the engagement means 37 are completely received in the moving block guides 154, the end sections of the engagement shanks 160, which still project from the adapter element 31, can be inserted into the longitudinal groove 27 (FIG. 9*d*), and such that when the engagement means 37 are moved out of the moving block guides 154, the engagement means 37 perform a rotational movement and the engagement shanks 160 engage behind the undercuts 30. In a stop position of the engagement means 37 in which the guide shanks 162 are supported in the active sections 156 of the moving block guides 154, the engagement shanks 160 ideally extend substantially horizontally such that they can cooperate with the undercut 30 of the longitudinal groove 27 in an optimal manner (FIG. 9*a*).

The movement of each of the engagement means 37 out of its insertion position and into its engagement position takes place against the restoring force of a spring element 164, whose outer end is fixed at an outer side 166 of the adapter element 31, and whose inner end is peripherally attached at the reinforced end section of the guide shank 162 of the engagement means 37 (FIG. 9*e*). The peripheral attachment of the spring elements 164 to the engagement means 37 supports the rotation of the engagement means 37 out of their engagement position and into their insertion position and therefore supports a movement of the engagement means 37 into the moving block guides 154.

The adjustment of the engagement means 37 out of their insertion position and into their engagement position and vice versa takes place by means of a rotation of the threaded bolt 40 relative to the adapter element 31, in other words by means of the upward or downward displacement of the threaded bolt 40. The coupling of the engagement means 37 to the threaded bolt 40 takes place via the transverse bolt 150 supported in the guide beam 142, which transverse bolts 150 extend through corresponding transverse bores 168 of the engagement means 37 (FIG. 9*f*). When the threaded bolt 40 is displaced downwards, in other words displaced into the adapter element 31, then the engagement means 37 are pressed downwards out of the moving block guides 154 via the guide beams 142 and the transverse bolts 150, in other words the engagement means 37 are brought out of their insertion position and into their engagement position (FIG. 9*g*). In contrast to this, when the threaded bolt 40 and therefore the guide beams 142 and the transverse bolts 150 are moved upwards, the engagement means 37 are pulled into the moving block guides 154 again, this means that the engagement means 37 are brought out of the engagement position and into the insertion position. In this connection, it is clear that the transverse bores 168 are formed such that they allow a rotation of the engagement means 37 relative to the transverse bolts 150 and therefore out of the insertion position and into the engagement position, and vice versa.

The clamping of the securing apparatus 14 at the load bed 12 takes place in a similar manner to the clamping in the previous embodiments by means of a tightening of the adapter element 31 relative to a housing 33 that surrounds the adapter element 31 and sits above the groove surroundings 28, this means by means of tightening the nut 44 which is threaded onto the upper thread section 42 of the threaded bolt.

However, it is also conceivable that the clamping of the adapter element 31 at the load bed 12 is realized by means of the guide beam 142, in that the guide beam 142 is moved downwards so far out of the adapter element 31 that it comes to rest on the central web 114 of the longitudinal groove 27, and the adapter element 31 is pressed upwards away from the load bed 12 in this manner while the engagement means 37 are simultaneously moved out of the insertion position and into the engagement position such that the engagement means 37 are brought into engagement with the undercuts 30 of the longitudinal groove 27 in a shape-matched and force-transmitting manner. This manner of clamping in turn would have the advantage that the clamping mechanism 38 would generally no longer require the housing 33, and in this way the housing 33 could be dispensed with.

In FIG. 10, a variant of the securing apparatus 14 of FIG. 9 having a housing 33 is illustrated, which housing 33 forms a mechanism for the securing of the engagement means 37 in their engagement position. On the one hand, the securing mechanism requires that the engagement means 37 extend a certain distance beyond the end faces 106 of the adapter element 31 and, on the other hand, that the securing mechanism comprises front walls 172 of the housing 33, which each comprise a latching recess 174 at their lower edge, which faces towards the longitudinal groove 27. The latching recesses 174 each receive projecting ends of the guide shanks 162 of the engagement means 37 in an exactly fitting manner via the end faces 106 of the adapter element 31, and prevent the engagement means 37 from being able to accidentally move into their insertion position in the clamped state of the securing apparatus 14.

In order to insert the engagement means 37 into the longitudinal groove 27, or in contrast to this, in order to release the engagement means 37 from the longitudinal groove, the housing 33 needs only to be lifted away from the adapter element 31 so far that the latching recesses 174 of the front walls 172 of the engagement means 37 are released such that the engagement means 37 can take on their insertion position while releasing the nut 44 (FIG. 10b).

In FIG. 11, a variant of the securing apparatus 14 of FIG. 9 is illustrated which does not require guide beams 142 or transverse bolts 150 and, for this reason, the threaded bolt 40 in this variant can be fixedly anchored to the adapter element 31.

As in the embodiment of FIG. 9, in the variant of FIG. 11, two angular engagement means 37 are movably supported in corresponding moving block guides 154. Similarly to the variant of FIG. 10, in the variant of FIG. 11, two engagement means 37 project a certain distance beyond the end faces 106 of the adapter element 31. Furthermore, the U section-like housing 33 is closed at its end faces by walls 172, which each comprise a latching recesses 174 at its lower edge for the securing of the engagement means 37 in its engagement position like in the variant of FIG. 10.

In the variant shown in FIG. 11, the adapter element 31 and the housing 33 are dimensioned such that intermediate spaces are formed between the end faces 106 of the adapter element 31 and the walls 172 of the end faces of the housing 33, in which intermediate spaces a torsion spring 176 is accommodated, which presses ends of the guide shanks 162, which extend beyond the end faces 106, and biases the engagement means 37 in their engagement position in this way.

In this variant, the control of the movement of the engagement means 37 out of their insertion position and into their engagement position and vice versa occurs by means of bent entrainer 180, which in a region of their first end are each attached in a rotatable manner at the end faces of the reinforced section of the guide shanks 162 of one of the engagement means 37, and which each comprise a slotted bore 182 in a region of their other end, by means of which the entrainer 180 are supported in a rotatable and displacable manner at an outer side of the housing 33, in particular at one of the front walls 172.

By lifting the housing 33 relative to the adapter element 31 and into the position shown in FIG. 11, the engagement means 37 are pulled against a restoring force of the torsion spring 176 and into their insertion position via the entrainer 180. In this state, the securing apparatus 14 can be released from the longitudinal groove 27 or inserted into the longitudinal groove 27. For the clamping of the securing apparatus 14 at the load bed 12, the securing apparatus 14 with the lifted housing 33 is placed over the longitudinal groove 27 such that the unobstructed ends of the engagement shanks 160 of the engagement means 37 can be inserted into the longitudinal groove 27. Then, the housing 33 is pressed downwards by means of which the engagement means 37 are displaced along the moving block guides 154 via the entrainer 180 and rotated in this connection until, for a completely pressed down housing 33, the engagement means 37 have taken on their engagement position, in which the engagement means 37 engage behind the undercuts 30 and in which the engagement means 37 are simultaneously secured by means of the latching recesses 174 in the front walls 172 of the housing 33.

In order to generate the desired clamping force, the adapter element 31 must then only be retracted relative to the housing 33, for example in the previously described manner by means of a nut 44, which is screwed onto an upper threaded section 42 of the threaded bolt 40 and supports itself on the top side of the housing 33.

FIG. 12 shows a further embodiment of a securing apparatus 14 which can be inserted into a longitudinal groove 27 independently of a groove cut-out of the longitudinal groove 27 at an arbitrary position along the longitudinal groove 27. In FIG. 12, the securing apparatus 14 is illustrated without a load securing means. However, as in the previously described embodiments, it is understood that the securing apparatus 14 of FIG. 12 can also be provided with an anchoring element 22, a fixing element 39 and/or any other arbitrary load securing means.

The clamping mechanism 38 of the securing apparatus 14 of FIG. 12 is similar to the clamping mechanisms 38 illustrated in FIGS. 6 and 7 to the extent that the clamping mechanism comprises an adapter element 31 that is received in a U section-like housing, and an actuation element 34 in the form of a threaded bolt 40, whose accessible upper section is provided with a thread 42, and whose lower section sits in a bore 80 of the adapter element 31 and is hereby fixedly connected to the adapter element 31, for example by means of screwing, bolting, gluing or welding. The actuation of the actuation element 34 takes place by means of a nut 44 which can be tightened by hand and is in engagement with the thread 42 of the threaded bolt 40, which nut 44 is not illustrated and is, for example, a T-nut.

Furthermore, the securing apparatus 14 of FIG. 12 comprises two engagement means 37, which can be pivoted between an insertion position and an engagement position, and which are supported in the adapter element 31. Each engagement means 37 comprises a support section 184, shaped like a round rod, from which a hook section 186, which is bent outwards approximately at a right angle and which projects from the adapter element 31, extends downwards in the direction of the longitudinal groove 27. Furthermore, the opposing section 188 extends opposite to the hook section 186, upwards and away from the support section 184, which is likewise substantially angled outwards at a right angle.

The front ends of the supporting sections 184 project beyond the end faces 106 of the adapter element 31 by a certain distance and are supported in support bores 190 in a rotatable manner, which support bores 190 are provided in end plates 192, which are attached onto the end faces of the adapter element 31, for example by means of screwing.

It is understood that corresponding recesses for the support sections 184, the hook sections 186 and the opposing sections 188 must be provided in the adapter element 31, which recesses enable a pivoting of the engagement means 37.

Furthermore, a spring element 194, in the present embodiment a compression spring, is arranged in a corresponding recess of the adapter element 31, which spring element 194 cooperates with the opposing sections 188 of the engagement means 37 and presses the opposing sections 188 apart, this means that each opposing section 188 is pressed outwards, and in this way, the spring element 194 forces the engagement means 37 into their insertion position, in which the engagement means 37 can be inserted into the longitudinal groove 27.

FIG. 12 shows the engagement means 37 in their engagement position, in which the hook sections 186 engage behind the undercuts 30, and the opposing sections 188 compress the spring element 194. For this purpose, the part sections of the opposing sections 188 which are bent outwards support themselves at the inner side of the housing 33, and thus prevent that the engagement means 37 are able to pivot back into their insertion position.

In order to release the securing apparatus 14 from the longitudinal groove 27, the housing 33 needs only to be lifted relative to the adapter element 31 to such an extent that the opposing sections 188 are released and are pivoted outwards by means of the restoring force of the spring element 194, which accompanies an inward pivoting of the hook sections 186, wherein the undercuts 30 are also released in this way.

In contrast to this, the securing apparatus 14 having a lifted housing 33, this means that the engagement means 37 are placed in their insertion position, is placed onto the longitudinal groove, and the housing is pressed downwards for the installation at the load bed 12. In a lower section of its inner sides, the housing 33 is provided with chamfers 196, onto which the part sections of the opposing sections 180 which laterally project out of the adapter element 31 run when the housing 33 is moved downwards, by means of which the opposing sections 188 are pressed inwards against the restoring force of the spring element 194, and the engagement means 37 are brought into their engagement position in this way.

As can be seen in FIG. 12, the W-shaped longitudinal groove in this embodiment of the securing apparatus 14 advantageously comprises a somewhat modified shape with respect to the previous examples. In this way, here the undercuts 30 are formed to be somewhat shorter, and the groove openings are formed to be somewhat wider in order to enable a sufficient pivoting movement of the hook sections 186.

The clamping of the securing apparatus 14 takes place in a similar manner to the clamping in the previous embodiments, by means of a tightening of the adapter element 31 relative to the housing 33 sitting above the groove surroundings 28, this means by means of tightening the nut 44 which is threaded onto the upper thread section 42 of the threaded bolt 40.

FIGS. 13 to 15 show a further embodiment of a securing apparatus 14 which can be inserted into a longitudinal groove 27 at an arbitrary position along the longitudinal groove 27, independently of a groove cut-out of the longitudinal groove 27.

The clamping mechanism 38 of the securing apparatus 14 of FIG. 13, similarly to the clamping mechanisms 38 of the securing apparatus 14 of FIGS. 6, 7 and 12, comprises a U section-like housing 33, which can be slid onto the adapter element 31 from above, or lifted off of the adapter element 31 from above. A threaded bolt 40 projects out and upwards from the adapter element. A lower section of the threaded bolt 40 sits in a bore of the adapter element 31, and is fixedly connected to the adapter element 31 in this way, for example, by means of screwing, bolting, gluing or welding. An upper section of the threaded bolt 40 extends through a bore in the base of the U section-like housing 33, and is accessible from the outside. The upper section of the threaded bolt 40 is provided with a thread 42, onto which a nut 44 is screwed. In the illustrated embodiment, the nut 44 is a hexagonal nut; however, a nut that can be tightened by hand, for example a T-nut, also alternatively comes into consideration. A plurality of spacer rings 196 are arranged between the nut 44 and the housing 33.

The adapter element 31 comprises a passage 198, which extends perpendicular to the longitudinal central axis of the threaded bolt 40 and in the direction of the longitudinal groove 27, which passage 198 extends approximately centered from a first end face 86 of the adapter element 31 to an opposite second end face, and which passage 198 is open in a downward direction, this means in the direction of the longitudinal groove 27, by means of which the adapter element 31 is given the shape of a U standing on its head, similarly to the housing 33. The width of the passage 198 corresponds substantially to the distance between the undercuts 30 of the longitudinal groove 27.

At its top side, this means the side facing away from the longitudinal groove 27, the passage 198 merges into two grooves 200, which each approximately have the shape of an L standing on its head, wherein horizontal sections 202 of the grooves 200 face away from each other, this means that the horizontal sections 202 each face outwards. Vertical sections 204 of the grooves 200 are each bounded from the outside by vertical flanks 206, which extend in parallel with respect to the longitudinal central axis of the threaded bolt 40 and are bounded from the inside by inclined sides 208 of the adapter element 31, which extend at an incline. Specifically, the inclined sides 208 are defined by a projection 210, which extends into the passage 198 from above and is tapered downwards, wherein a bottom side 212 of the projection 210 is formed flat, which gives the projection a trapezoidal cross-section.

Lateral longitudinal grooves 213 in which spring elements are received, in the present embodiment leaf springs 214, and which extend along a majority of the length of the passage 198 are introduced at approximately half the height of the vertical flanks 206. In the relaxed state, the leaf springs 214 project at least partially into the passage 198 and can be pressed into the lateral longitudinal grooves 213 against a restoring force.

Furthermore, two engagement means 37 which can be pivoted between an insertion position and an engagement position are supported in the adapter element 31. The engagement means 37 are formed as C-shaped sections and each comprise a base section 216 which extends in the direction of the passage 198 as well as flank sections 218 which face outwards and bound the base sections 216. The length of the engagement means 37 is selected to be greater than the length of the passage 198 such that the end sections of the engagement means 37 extend beyond the end faces of the adapter element 31.

The engagement means 37 are inserted into the passage 198, for example by sliding in, such that the upper sections of the engagement means 37 are received in the grooves 200 while the lower sections of the engagement means 37 project downwards and out of the adapter element 31 in order to be able to be inserted into the longitudinal groove 27 and engage behind the undercuts 30.

The grooves 200 are so generously dimensioned that the engagement means 37 have a sufficient play to be able to pivot between their insertion position (FIG. 13a) and their engaged position (FIG. 13b) in the grooves 200. In this connection, the base sections 216 of the engagement means 37 are in contact with the leaf springs 214 such that the pivoting from the insertion position and into the engagement position takes place against the restoring force of the leaf springs 214.

In order to secure the leaf springs 214 and the engagement means 37 against a longitudinal displacement within the passage 198, a securing pin 220 is provided which is received in transverse bores 222 of the adapter element 31 and extends transversely through the passage 198 and the engagement means 37 below the projection 210. It is understood that bores must be provided in the base sections 216 of the engagement means 37, for example, elongated holes, which are dimensioned to be sufficiently large in order not to prevent the pivoting of the engagement means 37. In the present embodiment, crescent shaped depressions are provided in the leaf springs 214 in which depressions the securing pin 220 is received in order to secure the leaf springs 214. However, it is alternatively conceivable that bores are provided in the leaf springs 214, and that the securing pin 220 extends through these bores.

As has already been mentioned, the engagement means 37 are forced into their insertion position by the leaf springs 214 (FIG. 13a). In order to place the engagement means 37 into their engagement position (FIG. 13b), the engagement means 37 must be pivoted outwards at their lower ends, this means that the outer ends are pressed apart from each other.

For this purpose, substantially rectangular actuation plates 224 are provided, which are attached, for example, by welding, at the insides of covers 226 that close off the open end faces of the U-shaped housing 33. The positioning and the dimensions, in particular the width, of the actuation plates 224 are adapted to the engagement means 37 such that when the housing 33 is pressed onto or falls down onto the adapter element 31, the actuation plates 224 are urged between the end sections of the engagement means 37 which project beyond the adapter element 31, press these end sections apart, and finally hold the end sections in their engagement position (FIG. 13b), in which the lower flank sections 218 of the engagement means 37 engage behind the undercuts 30.

In order to release the securing apparatus 14 from the longitudinal groove 27, the housing 33 needs only to be lifted relative to the adapter element 31 such that the engagement means 37, released from the actuation plates 224, are pivoted inwards again by means of the restoring force of the leaf springs 214, wherein the undercuts 30 are also released in this way.

Crescent shaped positioning grooves 228 are formed at the top and bottom sides of the actuation plates 224 for the correct positioning of the actuation plates 224 at the covers 226, which positioning grooves 228 cooperate with corresponding positioning projections of the covers 226. Furthermore, the actuation plates 224 comprise square, central slotted bores 229 which facilitate the welding of the actuation plates 224 to the covers 226.

For the correct positioning of the covers 226 at the housing 33, each cover 226 comprises a plurality of positioning grooves 230 at its outer sides in which positioning lugs 232 of the housing 33 engage. The covers 226 are preferably welded to the housing 33. However, it is generally also conceivable to detachably connect the covers 226 to the housing 33, for example, by screwing the covers 226 to the housing 33.

The clamping of the securing apparatus 14 takes place in a similar manner to the clamping in the previous embodiments, by means of a tightening of the adapter element 31 relative to the housing 33 sitting above the groove surroundings 28, this means by means of tightening the nut 44 which is threaded onto the upper thread section 42 of the threaded bolt 40.

In accordance with the embodiment illustrated in FIGS. 13 to 15, two bearing supports 234 for the support of an anchoring element 22, in this case an anchoring support 236, are attached at the top side of the housing 33. In order not to prevent the actuation of the nut 44, the spacer rings 196 are arranged between the nut 44 and the housing 33 for a compensation of the height of the bearing supports 234. It is understood that an anchoring support 236 which is supported in such a manner can also be provided for any of the previously described embodiments. In contrast to this, it is also possible to equip the securing apparatus 14 of FIGS. 13 to 15 with an anchoring element 22 in the manner of FIG. 2 or 7, having a fixing element 39 and/or any other arbitrary load securing means, or without having a load securing means at all.

LIST OF REFERENCE NUMERALS 10 paper roll
12 load bed
14 securing apparatus
16 wheel chock
18 lashing strap
20 lashing hook
22 anchoring element
24 eye
26 socket
27 longitudinal groove
28 groove surroundings
29 groove floor
30 undercut
31 adapter element
32 threaded bore
33 housing
34 actuation element
35 screw
36 screw head
37 engagement means
38 clamping mechanism
39 fixing element
40 threaded bolt
42 thread
44 nut
46 plate section
48 recess
50 plate section
52 finger section
56 rear side
56 recess
58 side surface
60 sheet metal section
62 sheet metal section
72 horizontal section
74 bore
76 sheet metal section
78 flank section
79 jacket surface
80 bore
82 C section
84 adapter groove
86 end face
88 bore
90 outer side
92 recess
94 slotted bore
95 support bore
96 transverse bore
98 compression spring
100 housing opening
102 chamfer
104 depression 106 end face
108 end plate
110 projection
112 recess
114 central web
116 cut-out
118 lower part
122 gear teeth
124 toothed rack
126 bore
128 outer end
130 spring element
132 inner end
134 cam element
136 recess
138 square rod
140 bit holder
142 guide beam
144 projection
148 lateral opening
150 transverse bolt
152 transverse opening
154 moving block guide
156 active section
158 passive section
160 engagement shank
162 guide shank
164 spring element
166 outer side
168 transverse bore
172 front wall
174 latching recess
176 torsion spring
178 shank
180 entrainer
182 slotted bore
184 support section
186 hook section
188 opposing section
190 support bore
192 end plate
194 spring element
196 spacer ring
198 passage
200 groove
202 horizontal section
204 vertical section
206 vertical flank
208 inclined side
210 projection
212 bottom side
213 longitudinal groove
214 leaf spring
216 base section
218 flank section
220 securing pin
222 transverse bore
224 actuation plate
226 cover
228 positioning groove
229 slotted bore
230 positioning groove
232 positioning lug
234 bearing support
236 anchoring support

What is claimed:

1. An apparatus (14) for the securing of a load (10) at a load bed (12), said load bed (12) having at least one longitudinal groove (27) including at least one undercut (30);

said apparatus (14) comprising a clamping mechanism (38), said clamping mechanism (38) comprising:
an actuation element (34);
an adapter element (31) having at least one engagement means (37), said engagement means (37) configured to be guided into the longitudinal groove (27) while extending in a direction parallel to said longitudinal groove; and
a housing at least partially surrounding the adapter element,
wherein said actuation element (34) is configured to clamp the undercut (30) of the longitudinal groove (27) in a shape-matched and force-transmitting manner between the engagement means and the housing with said engagement means continuing to extend in the direction parallel to said longitudinal groove.

2. The apparatus of claim 1, wherein two engagement means (37) are movably supported in or at the adapter element (31) and configured to be moved relative to one another out of an insertion position, in which they can be inserted in the longitudinal groove (27), into an engagement position, in which they engage behind an undercut (30) of the longitudinal groove (27) by at least one of a rotation, a pivoting, and a displacement.

3. The apparatus of claim 2, further comprising a spring element (98; 164; 176; 214) having a restoring force, wherein the engagement means (37) is configured to be brought out of the insertion position and into the engagement position or out of the engagement position and into the insertion position against said restoring force of said spring element.

4. The apparatus of claim 2, wherein the engagement means (37) is configured to be brought out of the insertion position into the engagement position by adjusting the actuation element (34) relative to the adapter element (31).

5. The apparatus of claim 4, wherein the actuation element further comprises a threaded bolt (40), and wherein the actuation element is configured to be adjusted relative to the adapter element (31) by rotating said threaded bolt.

6. The apparatus of claim 2, wherein said housing being is configured to bring the engagement means (37) out of the insertion position and into the engagement position by moving the housing (33) relative to the adapter element (31).

7. The apparatus of claim 2, further comprising a moving block guide (154) along which the engagement means (37) can be moved during its movement out of the insertion position and into the engaged position.

8. The apparatus of claim 2, further comprising a rack and pinion gear (122, 124) configured to translate a movement of the actuation element (34) into a movement of the engagement means (37).

9. The apparatus of claim 8, further comprising a cam gear configured to translate a movement of the actuation element into a movement of the engagement means.

10. The apparatus of claim 2, further comprising a cam gear configured to translate a movement of the actuation element into a movement of the engagement means.

11. The apparatus of claim 2, wherein the apparatus comprises two engagement means (37) movably supported in or at the adapter element (31) and configured to be moved out of the insertion position and into the engaged position in the manner of a scissor mechanism.

12. The apparatus of claim 2, further comprising an axis of rotation extending substantially parallel with respect to the longitudinal groove (27) in the state in which the apparatus (14) is installed at the load bed (12), wherein the engagement means (37) is configured to be rotated relative to the adapter element (31) about said axis of rotation.

13. The apparatus of claim 2, further comprising a spring element defining an axis of rotation for the engagement means (37), said spring element configured to bias the engagement means in the insertion position by cooperating with said engagement means (37).

14. The apparatus of claim 2, further comprising a spring element (194) having a restoring force; and a hook section extending from an axis of rotation for the engagement means (37) in the direction of the longitudinal groove (27) and configured to engage with an undercut (30) of the longitudinal groove (27); and an opposing section configured to face away from the hook section (186).

15. The apparatus of claim 14, wherein the spring element (194) is configured to cooperate with the hook section in order to bias the engagement means in the insertion position.

16. The apparatus of claim 14, wherein the spring element (194) is configured to cooperate with the opposing section in order to bias the engagement means in the insertion position.

17. The apparatus of claim 14, wherein the housing (33) is configured to bring the engagement means out of the insertion position and into an engagement position by cooperating with the opposing section (188) against a restoring force of the spring element (194).

18. The apparatus of claim 17, wherein the engagement means (37) is configured to be secured in the engagement position.

19. The apparatus of claim 2, further comprising a mechanism configured to secure the one or more engagement means (37) in its/their engaged position.

20. The apparatus of claim 2, wherein the adapter element further comprises an adapter groove, and the at least one engagement means (37) further comprises the shape of a C section comprising a first end and a second end, wherein the engagement means is configured to engage the undercut by inserting said first end into the longitudinal groove (27) and by engaging said second end in said adapter groove.

21. The apparatus of claim 20, further comprising a means of securing the engagement means (37) in said adapter groove.

22. The apparatus of claim 1, wherein the engagement means (37), having been inserted into the longitudinal groove (27), is configured to engage with an undercut (30) in a shape-matched and force-transmitting manner by moving an adapter element (31) away from the load bed (12) by adjusting the actuation element (34) relative to the adapter element (31).

23. An apparatus (14) for the securing of a load (10) at a load bed (12), said load bed (12) having at least one longitudinal groove (27) including at least one undercut (30);
    said apparatus (14) comprising a clamping mechanism (38), said clamping mechanism (38) comprising:
        an actuation element (34);
        an adapter element (31) having at least one engagement means (37), said engagement means (37) configured to be guided into the longitudinal groove (27),
        wherein said actuation element (34) is configured to engage the engagement means (37) of the adapter element (31) with the undercut (30) of the longitudinal groove (27) in a shape-matched and force-transmitting manner,
        wherein at least one of the one or more engagement means (37) is movably supported in or at the adapter element (31) and configured to be brought out of an insertion position, in which it can be inserted in the longitudinal groove (27), into an engagement position, in which it engages behind an undercut (30) of the longitudinal groove (27) by at least one of a rotation, a pivoting, and a displacement, and
        a rack and pinion gear (122, 124) configured to translate a movement of the actuation element (34) into a movement of the engagement means (37).

24. An apparatus (14) for the securing of a load (10) at a load bed (12), said load bed (12) having at least one longitudinal groove (27) including at least one undercut (30);
    said apparatus (14) comprising a clamping mechanism (38), said clamping mechanism (38) comprising:
        an actuation element (34);
        an adapter element (31) having at least one engagement means (37), said engagement means (37) configured to be guided into the longitudinal groove (27),
        wherein said actuation element (34) is configured to engage the engagement means (37) of the adapter element (31) with the undercut (30) of the longitudinal groove (27) in a shape-matched and force-transmitting manner,
        wherein at least one of the one or more engagement means (37) is movably supported in or at the adapter element (31) and configured to be brought out of an insertion position, in which it can be inserted in the longitudinal groove (27), into an engagement position, in which it engages behind an undercut (30) of the longitudinal groove (27) by at least one of a rotation, a pivoting, and a displacement, and
        a cam gear configured to translate a movement of the actuation element into a movement of the engagement means.

* * * * *